United States Patent
Lee et al.

(10) Patent No.: US 11,623,525 B2
(45) Date of Patent: Apr. 11, 2023

(54) ELECTRONIC APPARATUS AND CONTROLLING METHOD THEREOF

(71) Applicant: SAMSUNG ELECTRONICS CO., LTD., Suwon-si (KR)

(72) Inventors: Youngseok Lee, Suwon-si (KR); Taewon Um, Suwon-si (KR); Jaehoon Kim, Suwon-si (KR); Hyewon Kim, Suwon-si (KR); Seungwoo Shin, Suwon-si (KR); Yuhyeon Jun, Suwon-si (KR); Yongjin Choi, Suwon-si (KR); Wooseok Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 494 days.

(21) Appl. No.: 16/728,406

(22) Filed: Dec. 27, 2019

(65) Prior Publication Data
US 2020/0207208 A1 Jul. 2, 2020

(30) Foreign Application Priority Data
Jan. 2, 2019 (KR) .................. 10-2019-0000445

(51) Int. Cl.
*B60K 37/06* (2006.01)
*B60K 35/00* (2006.01)
*B60K 37/02* (2006.01)

(52) U.S. Cl.
CPC .............. *B60K 37/06* (2013.01); *B60K 35/00* (2013.01); *B60K 37/02* (2013.01);
(Continued)

(58) Field of Classification Search
CPC ........ B60K 37/06; B60K 37/02; B60K 35/00; B60K 2370/731; B60K 2370/139;
(Continued)

(56) References Cited

U.S. PATENT DOCUMENTS 8,598,999 B2   12/2013   Tuzar
9,361,000 B2   6/2016   Furue et al.
(Continued)

FOREIGN PATENT DOCUMENTS

DE   102013009603   12/2014
JP   2014-2571   1/2014
(Continued)

OTHER PUBLICATIONS

Extended European Search Report and Written Opinion dated Nov. 26, 2021 in corresponding European Application No. 19907151.5.
(Continued)

*Primary Examiner* — Christopher E Leiby
(74) *Attorney, Agent, or Firm* — Nixon & Vanderhye, P.C.

(57) ABSTRACT

An electronic apparatus disposed in a vehicle is provided. The electronic apparatus includes an input device including a body configured to be rotatable and pushable and a display disposed on the body; and a processor configured to acquire profile data of a user including preset information for function of the vehicle, control the display to display basic user interface (UI) corresponding to the function of the vehicle based on the acquired profile data of the user, and control a function of the vehicle corresponding to the basic UI in response to receiving an input on the input device.

16 Claims, 25 Drawing Sheets

(52) U.S. Cl.
CPC ... *B60K 2370/113* (2019.05); *B60K 2370/115* (2019.05); *B60K 2370/122* (2019.05); *B60K 2370/126* (2019.05); *B60K 2370/1438* (2019.05); *B60K 2370/186* (2019.05); *B60K 2370/731* (2019.05)

(58) Field of Classification Search
CPC ........ B60K 2370/186; B60K 2370/122; B60K 2370/1537; B60K 2370/128; B60K 2370/148; B60K 2370/1438; B60K 2370/741; B60K 2370/113; B60K 2370/126; B60K 2370/111; B60K 2370/115; B60K 2370/736
See application file for complete search history.

(56) References Cited

U.S. PATENT DOCUMENTS

| | | | |
|---|---|---|---|
| 9,467,515 B1* | 10/2016 | Penilla | B60L 53/80 |
| 9,620,309 B2 | 4/2017 | Hoskins et al. | |
| 10,223,134 B1* | 3/2019 | Penilla | G06F 3/04845 |
| 2006/0190843 A1 | 8/2006 | Takashima et al. | |
| 2014/0380243 A1 | 12/2014 | Furue et al. | |
| 2015/0133164 A1 | 5/2015 | Song et al. | |
| 2016/0077601 A1 | 3/2016 | Tanaka | |
| 2016/0353305 A1 | 12/2016 | Zakaria et al. | |
| 2017/0255280 A1* | 9/2017 | Pacsai | H01H 19/025 |
| 2018/0178781 A1 | 6/2018 | Funk et al. | |
| 2018/0298959 A1 | 10/2018 | Battlogg | |
| 2019/0163288 A1* | 5/2019 | You | B60K 37/06 |
| 2019/0196851 A1* | 6/2019 | Penilla | G06F 3/0488 |

FOREIGN PATENT DOCUMENTS

| | | |
|---|---|---|
| JP | 6136627 | 5/2017 |
| KR | 10-2012-0054739 | 5/2012 |
| KR | 10-2016-0021509 | 2/2016 |
| KR | 10-1638543 | 7/2016 |
| KR | 10-2019-0069635 | 6/2019 |

OTHER PUBLICATIONS

International Search Report and Written Opinion dated Apr. 17, 2020 in counterpart International Patent Application No. PCT/KR2019/018652.
Communication Pursuant to Article 94(3) EPC dated Sep. 28, 2022 in corresponding EP Application No. 19907151.5.

* cited by examiner

ELECTRONIC APPARATUS AND CONTROLLING METHOD THEREOF

CROSS-REFERENCE TO RELATED APPLICATION

This application is based on and claims priority under 35 U.S.C. § 119 to Korean Patent Application No. 10-2019-0000445, filed on Jan. 2, 2019, in the Korean Intellectual Property Office, the disclosure of which is incorporated by reference herein in its entirety.

BACKGROUND

Field

The disclosure relates to an electronic apparatus and a controlling method thereof, and for example, to an electronic apparatus disposed in a vehicle and a controlling method thereof.

Description of Related Art

With the development of electronic technology, various electronic devices are disposed in vehicles. Such electronic devices may provide various functions or various services to a user boarding the vehicle.

In order to use various functions provided by the electronic devices disposed in the vehicle, various types of inputs are required for the user. In particular, the demand of various types of inputs to the driver while driving the vehicle may cause an accident to increase.

Therefore, there is a need for a more safe and convenient way to use the functions or services provided in the vehicle.

SUMMARY

Embodiments of the disclosure overcome the above disadvantages and other disadvantages not described above.

The disclosure provides an electronic apparatus which may allow functions or services provided in a vehicle to be more safely and conveniently used, and a controlling method thereof.

In addition, the disclosure provides an electronic apparatus which provides a personalized service according to a user of a vehicle, and provides a function control suitable for a context of the user of the vehicle, and a controlling method thereof.

According to an example embodiment of the disclosure, an electronic apparatus disposed in a vehicle includes an input device including a body configured to be rotatable and pushable and a display disposed on the body; and a processor configured to acquire profile data of a user including preset information for function of the vehicle, control the display to display basic user interface (UI) corresponding to the function of the vehicle based on the acquired profile data of the user, and control the function of the vehicle corresponding to the basic UI in response to receiving an input on the input device.

The functions of the vehicle may include at least one of functions provided by the vehicle or functions provided by an in-vehicle infotainment (IVI) system disposed in the vehicle.

The electronic apparatus may include a memory configured to store profile data for each user including information on the function of the vehicle preset for each user, wherein the processor is configured to: control the display to display a UI for user selection in response to the vehicle being started, control the display to display a basic UI corresponding to the function of the vehicle set for a previously selected user based on profile data of the previously selected user in response to a preset time elapsing without manipulating the input device while the UI for user selection is displayed on the display, and control the display to display a first UI corresponding to the function of the vehicle set for a newly selected user based on profile data of the newly selected user based on the user being newly selected through the manipulation of the input device through the UI for user selection is displayed on the display.

The processor may be configured to control the electronic apparatus: control the display to display a UI corresponding to function frequently used by the user at the time of starting the vehicle among the functions of the vehicle based on the profile data of the user, in response to the vehicle being started, and control the display to display a basic UI corresponding to the function of the vehicle set for the user based on the profile data of the user, in response to a preset time elapsing without manipulating the input device through the UI corresponding to the function frequently used by the user at the time of starting the vehicle is displayed on the display.

The functions frequently used by the user at the time of starting up the vehicle may include functions that are previously set as those frequently used by the user at the time of starting up the vehicle among a plurality of functions provided by an IVI system disposed in the vehicle.

The electronic apparatus may include a communicator comprising circuitry, wherein the processor is configured to: control the communicator to transmit a command for executing the function frequently used by the user at the time of starting the vehicle to the IVI system in response to the input device being pushed and the UI corresponding to the function frequently used by the user at the time of starting the vehicle is displayed on the display, and control the display to display the basic UI based on the profile data of the user, in response to the function frequently used by the user at the time of starting the vehicle executed based on the push manipulation being terminated.

The processor may be configured to control the display to change the basic UI to a UI related to a user manipulation on an input device of another electronic apparatus in response to the user manipulation on the another electronic apparatus disposed in the vehicle being input while the basic UI is displayed on the display, and the input device of the another electronic apparatus may include a display disposed on at least a portion of a body configured to be rotatable and pushable.

The processor may be configured to control the display of the electronic apparatus to change the UI related to the user manipulation back to the basic UI in response to a preset time elapsing without manipulation of the input device of the electronic apparatus and the input device of the another electronic apparatus and the UI related to the user manipulation is displayed on the display of the electronic apparatus.

The processor may be configured to control display of the electronic apparatus to change a first basic UI to a third UI corresponding to a function associated with a second function in response to user manipulation on the input device of the another electronic apparatus being input while the first basic UI corresponding to a first function of the vehicle is displayed on the display of the electronic apparatus and a second basic UI corresponding to the second function of the vehicle is displayed on the display of the another electronic apparatus based on the profile data of the user.

The processor may be configured to control the display to change the basic UI to a UI corresponding to a function associated with an executed one function in response to one function of a plurality of functions provided by an IVI system disposed in the vehicle being executed and the basic UI is displayed on the display.

The processor may be configured to control the display to change the UI corresponding to the function associated with an executed function back to the basic UI in response to the function executed in the IVI system being terminated.

The electronic apparatus may include a communicator comprising circuitry, wherein the processor is configured to: control the display to display a UI for selecting one of a plurality of preset destinations based on the profile data of the user in response to a navigation function provided by an IVI system disposed in the vehicle being executed, and control the communicator to transmit information about a selected destination to the IVI system in response to the destination being selected on the UI for selecting the destination through the manipulation of the input device.

The electronic apparatus may include a communicator comprising circuitry, wherein the processor is configured to: control the display to display a UI for selecting one of a plurality of preset destinations based on the profile data of the user in response to a navigation function provided by an IVI system disposed in the vehicle being executed, and control the communicator to transmit information about a selected destination to the IVI system in response to the destination being selected on the UI for selecting the destination through the manipulation of the input device.

The processor may be configured to control the display to display a UI for selecting an Internet of Things (IoT) device based on the profile data of the user in response to the vehicle being located within in a preset distance from a destination set by a navigation function executed in an IVI system disposed in the vehicle, and control the display to display a UI for controlling a selected IoT device in response to the IoT device being selected on the UI for selecting the IoT device through the manipulation of the input device.

The processor may be configured to control the display to display a UI corresponding to function frequently used by the user during driving on at least one region of the display on which the basic UI is displayed based on the profile data of the user, and the function frequently used by the user during driving may include functions previously set as those frequently used by the user during driving among a plurality of functions provided by an IVI system disposed in the vehicle.

The electronic apparatus may include a communicator comprising circuitry, wherein the processor is configured to: based on the basic UI and the UI corresponding to the function frequently used by the user during driving being displayed together on the display, control the function of the vehicle corresponding to the basic UI, in response to a first manipulation on the input device being input, and control the communicator to transmit a command for executing the functions frequently used by the user during driving to the IVI system in response to a second manipulation on the input device being input.

The electronic apparatus may include a communicator comprising circuitry, wherein the processor is configured to control the display to display the basic UI based on the received profile data of the user in response to the profile data of the user being received through the communicator from an external mobile device.

The electronic apparatus may include a communicator comprising circuitry, wherein the processor is configured to, in response to the information about a content being reproduced in an external mobile device being received, control the communicator to transmit the received information about the content to an IVI system disposed in the vehicle, and the IVI system is configured to play the content being reproduced in the external mobile device based on the information received from the electronic apparatus.

According to another example embodiment of the disclosure, a method of controlling an electronic apparatus disposed in a vehicle, wherein the electronic apparatus includes an input device comprising a body configured to be rotatable and pushable and a display disposed on the body, the method comprising: acquiring profile data of a user including preset information for functions of the vehicle; displaying a basic UI corresponding to the function of the vehicle based on the acquired profile data of the user; and controlling the function of the vehicle corresponding to the basic UI in response to receiving a manipulation input to the input device.

According to still another example embodiment of the disclosure, an input system for a vehicle including a plurality of electronic apparatuses, includes: a first electronic apparatus configured to display a first basic UI corresponding to a first function of the vehicle based on profile data of a user including information preset for functions of the vehicle; and a second electronic apparatus configured to display a second basic UI corresponding to a second function of the vehicle based on the profile data of the user, and each of the first and second electronic apparatuses includes an input device comprising a body configured to be rotatable and pushable and a display disposed on the body, and wherein the first and second electronic apparatus are configured to control the function of the vehicle corresponding to the first or second basic UI based on a manipulation received by each input device.

As described above, according to various example embodiments of the disclosure, the user of the vehicle may more safely and conveniently use the functions or the services provided in the vehicle. In addition, the personalized service may be provided based on the user of the vehicle, and the function control suitable for the context of the user of the vehicle may be provided. Accordingly, the user of the vehicle may quickly manipulate various functions provided in the vehicle while minimizing and/or reducing gaze deviation.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 8 is a diagram illustrating example profile data for each user according to an embodiment of the disclosure;

DETAILED DESCRIPTION

Figure 1A:
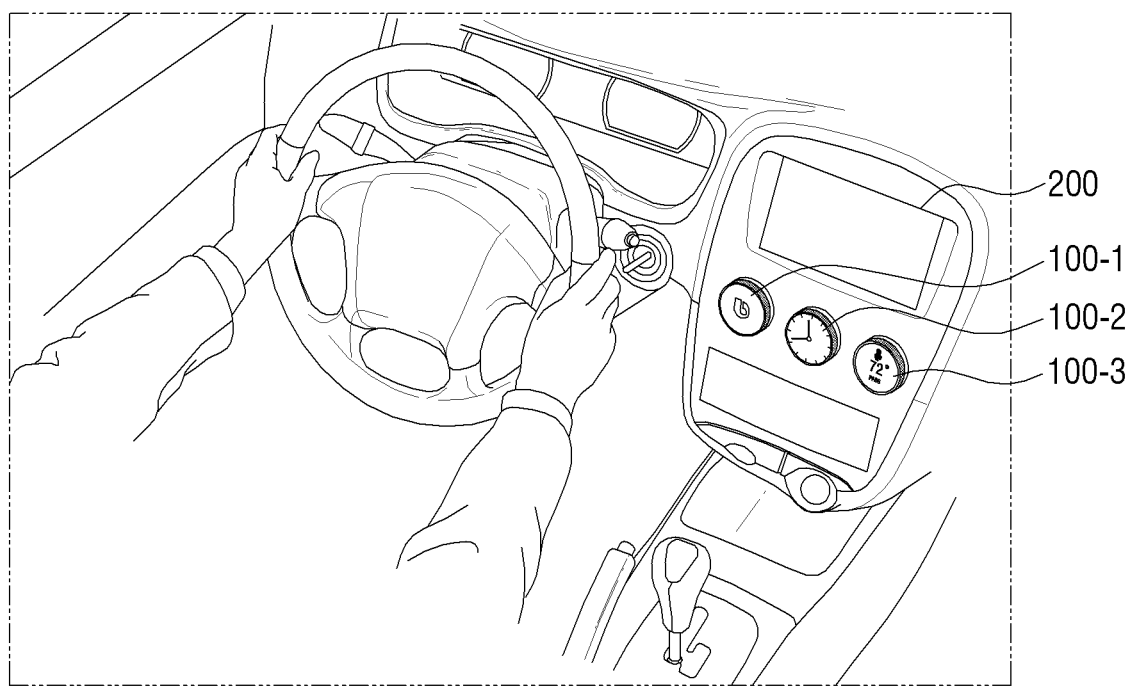
FIG. 1A is a diagram illustrating an example in-vehicle environment according to an embodiment of the disclosure.

Hereinafter, various example embodiments of the disclosure will be described with reference to the accompanying drawings. However, it will be understood that technologies mentioned in the disclosure are not limited to specific embodiments, but include all modifications, equivalents, and/or substitutions according to embodiments of the disclosure. In connection with the description of the drawings, similar reference numerals may be used for similar components.

In the disclosure, an expression "have", "may have", "include", "may include", or the like, indicates an existence of a corresponding feature (for example, a numerical value, a function, an operation, a component such as a part, or the like), and does not exclude an existence of an additional feature.

In the disclosure, an expression "A or B", "at least one of A and/or B", "one or more of A and/or B", or the like, may include all possible combinations of items listed together. For example, "A or B", "at least one of A and B", or "at least one of A or B" may indicate all of 1) a case in which at least one A is included, 2) a case in which at least one B is included, or 3) a case in which both of at least one A and at least one B are included.

When it is mentioned that any component (for example, a first component) is (operatively or communicatively) coupled with/to or is connected to another component (for example, a second component), it is to be understood that any component may be directly coupled with/to another component or may be coupled with/to another component through the other component (for example, a third component). On the other hand, when it is mentioned that any component (for example, a first component) is "directly coupled with/to" or "directly connected to" to another component (for example, a second component), it is to be understood that another component (for example, a third component) is not present between any component and another component.

An expression "configured (or set) to" used in the disclosure may be used interchangeably with an expression "suitable for", "having the capacity to", "designed to", "adapted to", "made to", or "capable of" depending on a context. A term "configured (or set) to" may not necessarily refer only to "specifically designed to" in hardware. Instead, in any context, an expression "an apparatus configured to" may refer to a situation in which the apparatus is "capable of" together with other apparatuses or components. For example, a "processor configured (or set) to perform A, B, and C" may refer, for example, and without limitation, to a dedicated processor (for example, an embedded processor) for performing the corresponding operations, a generic-purpose processor (for example, a central processing unit (CPU) or an application processor), or the like, that may perform the corresponding operations by executing one or more software programs stored in a memory device.

Hereinafter, various example embodiments of the disclosure will be described in greater detail with reference to the accompanying drawings.

FIG. 1A is a diagram illustrating an example in-vehicle environment according to an embodiment of the disclosure.

Referring to FIG. 1A, an in-vehicle environment 10 may include a plurality of electronic apparatuses 100-1, 100-2, and 100-3, an in-vehicle infotainment (IVI) system 200, and a vehicle control system (not illustrated) disposed in the vehicle.

The vehicle control system (not illustrated) may provide various functions provided in the vehicle. For example, the vehicle control system (not illustrated) may provide various functions such as, for example, and without limitation, a steering function associated with driving of the vehicle, a heating, ventilation and air conditioning (HVAC) function, a seat position adjusting function, a seat temperature adjusting function, a rearview mirror adjusting function, a window and sunroof control function, an oil-hole opening and closing function, a volume control function, a clock function, a driving mode setting function, a voice agent function, a head up display (HUD) function to a user in the vehicle, or the like. However, the functions that may be provided by the vehicle control system (not illustrated) are not limited thereto.

The in-vehicle infotainment (IVI) system (hereinafter referred to as IVI system) 200 is a general term for entertainment and information systems that the user may enjoy in the vehicle, and may provide various functions to the user in the vehicle. For example, the IVI system 200 may provide various functions such as various functions interlocked with a mobile device, such as, for example, and without limitation, call, message, alarm, etc., various multimedia functions such as, for example, and without limitation, movies, games, music, TV, radio, an Internet function, a voice recognition function, a navigation function, or the like, to the user in the vehicle. However, the functions that may be provided by the IVI system 200 are not limited thereto.

The functions provided by the vehicle control system (not illustrated) and the functions provided by the IVI system 200 are not limited to the above-described examples. In addition, according to an embodiment, at least some of the functions provided by the vehicle control system (not illustrated) described above may be provided by the IVI system 200, and at least some of the functions provided by the IVI system 200 described above may also be provided by the vehicle control system (not illustrated).

A plurality of electronic apparatuses 100-1, 100-2, and 100-3 may receive user manipulations for using the functions provided by the vehicle control system (not illustrated) or the IVI system 200 from the user located in the in-vehicle environment 10, and control functions of the vehicle according to the received user manipulations.

For example, each of the plurality of electronic apparatuses 100-1, 100-2, and 100-3 may display a user interface (UI) corresponding to the function of the vehicle, and control the function of the vehicle corresponding to the displayed UI according to a received user manipulation when receiving the user manipulation.

Each of the plurality of electronic apparatuses 100-1, 100-2, and 100-3 may be connected to the vehicle control system (not illustrated) and the IVI system 200 that provide the functions of the vehicle through wired and wireless communication methods. For example, the communication method may be a controller area network (CAN) method, but is not limited thereto.

Figure 1B:
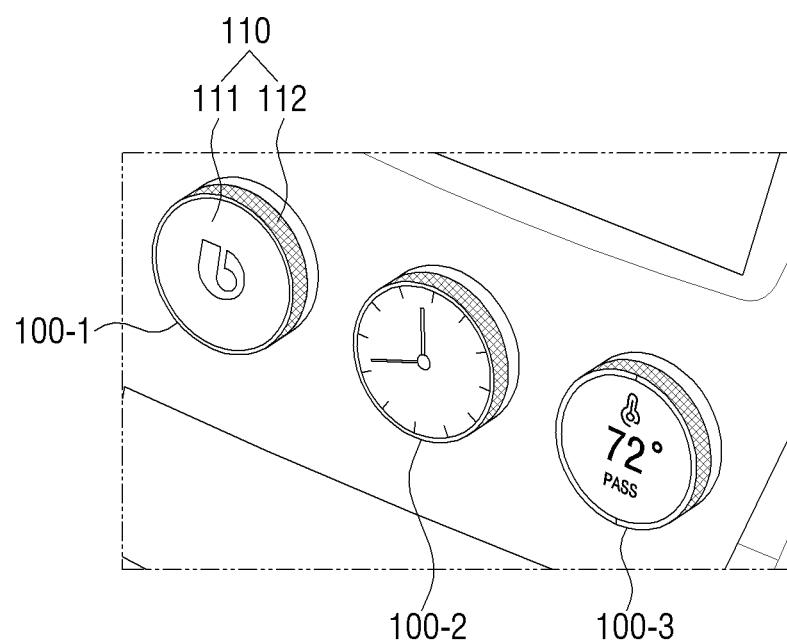
FIG. 1B is a diagram illustrating an example electronic apparatus according to an embodiment of the disclosure.

In addition, each of the plurality of electronic apparatuses 100-1, 100-2, and 100-3 may include a body part (e.g., a body) configured to be rotatable and pushable and a display disposed on the body part. FIG. 1B is a diagram illustrating an example of the plurality of electronic apparatuses 100-1, 100-2, and 100-3. As illustrated in FIG. 1B, it may be seen that each of the plurality of electronic apparatuses 100-1, 100-2, and 100-3 includes a body part 112 configured to be rotatable and pushable and a display 111 disposed on the body part. The electronic apparatus having such a configuration may be referred to as a vehicle knob, but the name is not limited thereto.

Each of the plurality of electronic apparatuses 100-1, 100-2, and 100-3 may control a function of a vehicle according to a user manipulation by transmitting information corresponding to a received user manipulation (e.g., function information of the vehicle corresponding to a UI displayed on the display 111 at the time of user manipulation and control information on the corresponding function) when a rotational manipulation or push manipulation of the user with respect to the body part 112 is received, while a UI corresponding to the function of the vehicle is displayed on the display 111.

For example, according to an embodiment of the disclosure, each of the plurality of electronic apparatuses 100-1, 100-2, and 100-3 may display a basic UI corresponding to the function of the vehicle, based on profile data of the user including preset information on the function of the vehicle.

The basic UI may refer, for example, to a UI indicating a function of a vehicle which is basically allocated to each of the plurality of electronic apparatuses 100-1, 100-2, and 100-3 based on the profile data of the user among the various functions of the vehicle described above, and may refer, for example, to a UI which is always displayed on each of the plurality of electronic apparatuses 100-1, 100-2, and 100-3 after the vehicle is started up, except when an initial UI is displayed in a specific case or another UI is displayed in a specific context as described below.

The user may preset the function of the vehicle to be displayed as the basic UI, and the plurality of electronic apparatuses 100-1, 100-2, and 100-3 may display the basic UI based on the information set as described above.

The function of the vehicle, which may be set as the basic UI, may include at least one of the functions provided by the vehicle control system (not illustrated) and the IVI system described above. Therefore, for example, when the voice agent function, the clock function, and the HVAC temperature adjusting function are set to profile data of a user A as basic UIs for the electronic apparatus 100-1, the electronic apparatus 100-2, and the electronic apparatus 100-3, respectively, each of the plurality of electronic apparatuses 100-1, 100-2, and 100-3 may display the basic UIs corresponding to the voice agent function, the clock function, and the HVAC temperature adjusting function as illustrated in FIG. 1B based on the profile data of the user A.

Accordingly, the user may execute the voice agent function displayed on the electronic apparatus 100-1 by, for example, manipulating the electronic apparatus 100-1 to be pushed and use the voice agent function provided in the vehicle.

As such, according to an embodiment of the disclosure, each of the plurality of electronic apparatuses 100-1, 100-2, and 100-3 may provide a function control of the vehicle based on the profile data of the user, thereby providing a personalized service to the user of the vehicle. Accordingly, the user of the vehicle may use the functions of the vehicle more conveniently in an environment optimized for himself or herself.

The plurality of electronic apparatuses 100-1, 100-2, and 100-3 may be disposed on one region of a dashboard. For example, as illustrated in FIG. 1A, three electronic apparatuses 100-1, 100-2, and 100-3 may be disposed in a center fascia region or a region around the center fascia in the dashboard to allow the user to control the functions of the vehicle while sitting in a driver's seat (or passenger's seat). However, the disclosure is not limited thereto.

The number of electronic apparatuses or the location where the electronic apparatuses are disposed in the in-vehicle environment 10 is not limited thereto. According to an embodiment, two or four or more electronic apparatuses may be disposed in the dashboard region or other region of the vehicle, and one or more electronic apparatuses may be more disposed in a rear seat region of the vehicle.

According to an embodiment of the disclosure, each of the plurality of electronic apparatuses 100-1, 100-2, and 100-3 may change the basic UI to another UI according to a context of the user. Such an example embodiment will be described in greater detail below with reference to FIG. 2.

Figure 2:
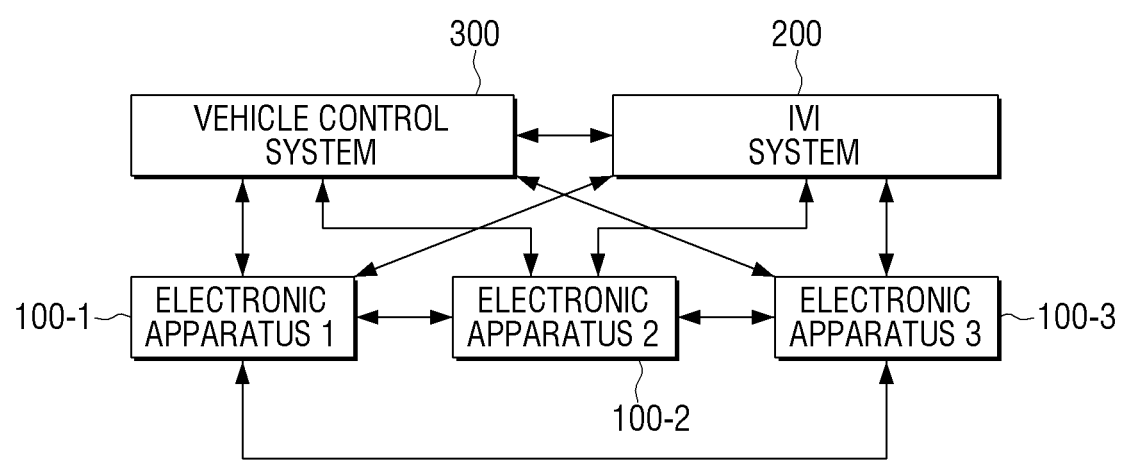
FIG. 2 is a block diagram illustrating an example vehicle input system including a plurality of electronic apparatuses according to an embodiment of the disclosure.

FIG. 2 is a block diagram illustrating an example vehicle input system including a plurality of electronic apparatuses according to an embodiment of the disclosure. Referring to FIG. 2, a vehicle input system 20 may include a plurality of electronic apparatuses 100-1, 100-2, and 100-3, an IVI system 200, and a vehicle control system 300. The vehicle input system 20 of FIG. 2 may be included in the in-vehicle environment 10 of FIG. 1.

Referring to FIG. 2, each of the electronic apparatus 1 100-1, the electronic apparatus 2 100-2, and the electronic apparatus 3 100-3 may be communicatively connected to the IVI system 200 and the vehicle control system 300, and the electronic apparatuses 100-1, 100-2 and 100-3 may be communicatively connected to each other to transmit and receive a signal. In this case, each of the components of FIG. 2 may be communicatively connected to each other in a controller area network (CAN) method, but is not limited thereto.

As described above, each of the plurality of electronic apparatuses 100-1, 100-2, and 100-3 may display the basic UI for controlling the function of the vehicle based on the profile data of the user. According to an embodiment of the disclosure, each of the plurality of electronic apparatuses 100-1, 100-2, and 100-3 may change the basic UI to another UI according to a context of the user. For example, the context of the user may include a context in which a user manipulation for another electronic apparatus is input or one of a plurality of functions provided by the IVI system 200 is executed, while the basic UI is displayed.

For example, according to an embodiment of the disclosure, each of the plurality of electronic apparatuses 100-1, 100-2, and 100-3 may change the basic UI to a UI related to a user manipulation for another electronic apparatus when the user manipulation for another electronic apparatus is input while the basic UI is displayed.

For example, when a user manipulation for the electronic apparatus 3 100-3 is input, while a first basic UI corresponding to a first function of the vehicle is displayed on the electronic apparatus 1 100-1, a second basic UI corresponding to a second function of the vehicle is displayed on the electronic apparatus 2 100-2, a third basic UI corresponding to a third function of the vehicle is displayed on the electronic apparatus 3 100-3, based on the profile data of the user, the electronic apparatus 1 100-1 and the electronic apparatus 2 100-2 may change the first basic UI and the second basic UI to a UI corresponding to a function associated with the third function of the vehicle.

If a user manipulation for the electronic apparatus 2 100-2 is input in the above context, the electronic apparatus 1 100-1 and the electronic apparatus 3 100-3 may change the first basic UI and the third basic UI which were displayed to a UI corresponding to a function associated with the second function of the vehicle. In addition, if a user manipulation for the electronic apparatus 1 100-1 is input in the above context, the electronic apparatus 2 100-2 and the electronic apparatus 3 100-3 may change the second basic UI and the third basic UI to a UI corresponding to a function associated with the first function of the vehicle.

If a preset time elapses without any user manipulation after the UI changed according to the user manipulation for another electronic apparatus is displayed, each of the plurality of electronic apparatuses 100-1 to 100-3 may change the changed UI back to the basic UI that was originally displayed.

In addition, according to another embodiment of the disclosure, if one of the plurality of functions provided by the IVI system 200 is executed while the basic UI is displayed, each of the plurality of electronic apparatuses 100-1, 100-2, and 100-3 may change the displayed basic UI to a UI corresponding to a function associated with the executed one function.

For example, if a fourth function, which is one of the plurality of functions provided by the IVI system 200 is executed, while a first basic UI corresponding to a first function of the vehicle is displayed on the electronic apparatus 1 100-1, a second basic UI corresponding to a second function of the vehicle is displayed on the electronic apparatus 2 100-2, a third basic UI corresponding to a third function of the vehicle is displayed on the electronic apparatus 3 100-3, based on the profile data of the user, each of the electronic apparatuses 1 to 3 100-1 to 100-3 may change the first to third basic UIs which were displayed to a UI corresponding to a function associated with the fourth function executed in the IVI system 200.

According to an embodiment, the fourth function may also be executed through a user manipulation for any one of the plurality of electronic apparatuses 100-1 to 100-3, and may also be executed through a user manipulation for a separate inputter (e.g., input device including input circuitry) provided in the IVI system 200. In addition, the fourth function executed in the IVI system 200 may be different from the first to third functions, but is not limited thereto, and may be any one of the first to third functions according to an embodiment.

If the fourth function is terminated in the IVI system 200 after the UI corresponding to the fourth function is displayed as described above, each of the plurality of electronic apparatuses 100-1 to 100-3 may change the UI corresponding to the fourth function back to the basic UI that was originally displayed.

As described above, according to various example embodiments of the disclosure, by displaying the associated UI on the plurality of electronic apparatuses 100-1, 100-2 and 100-3 in consideration of the context of the user, the user may use various functions provided in the vehicle more conveniently and quickly while minimizing gaze deviation.

In the vehicle input system 20 of FIG. 2, the case in which the three electronic apparatuses 100-1, 100-2 and 100-3 are disposed in the vehicle has been described as an example, but according to an embodiment, the vehicle input system 20 including two electronic apparatuses or four or more electronic apparatuses may be constructed.

In addition, in the example of FIG. 2, the vehicle input system 20 includes both the vehicle control system 300 and the IVI system 200 as an example, but the embodiment is not limited thereto. For example, the vehicle input system 20 including only the vehicle control system 300 and the plurality of electronic apparatuses 100-1, 100-2, and 100-3 without the IVI system 200 is also possible. In this case, except for the embodiment associated with the IVI system 200, all other embodiments described herein may be implemented.

Figure 3:
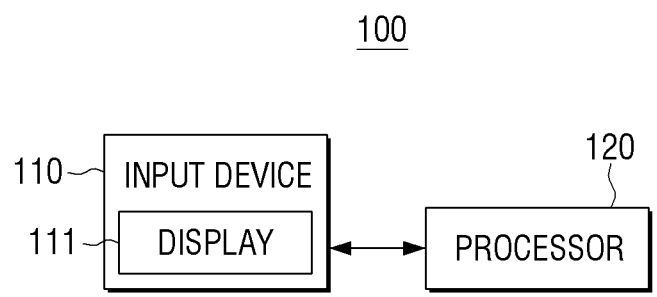
FIG. 3 is a block diagram illustrating an example electronic apparatus according to an embodiment of the disclosure.

FIG. 3 is a block diagram illustrating an example electronic apparatus according to an embodiment of the disclosure. Referring to FIG. 3, an electronic apparatus 100 includes an input device (e.g., including input circuitry) 110 and a processor (e.g., including processing circuitry) 120. The electronic apparatus 100 of FIG. 3 may, for example, be any one of the plurality of electronic apparatuses 100-1, 100-2, and 100-3 described above.

The input device 110 may include various input circuitry and receive a user manipulation for the electronic apparatus 100. For example, the input device 110 may include a body (e.g., 112 in FIG. 2) configured to be rotatable and pushable and a display 111 disposed on the body part.

The display 111 may output a signal processed by the processor 120 to display various contents, graphic objects, indications, texts, still images, moving images, and the like. For example, the display 111 may display various UIs including a graphical user interface (GUI) so that a user may interact with the electronic apparatus 100.

The display 111 may be configured or implemented, for example, and without limitation, as a liquid crystal display (LCD) panel, an organic light emitting diode (OLED) panel, an inorganic light emitting diode (LED) panel, or the like. According to an embodiment, the display 111 may be configured as a touch screen together with a touch sensor.

If a push manipulation or a rotation manipulation of the user is input, the input device 110 may detect the input push or rotation manipulation and provide a signal according to the detected manipulation to the processor 120.

The processor 120 may include various processing circuitry and controls an overall operation of the electronic apparatus 100. The processor 120 may be disposed to be included in one area of the body part of the input device 110, but is not limited thereto.

The processor 120 may be implemented, for example, and without limitation, as one or more of a central processing unit (CPU), a dedicated processor, a micro-controller, an application processor (AP), a communication processor (CP), an ARM processor, a microcomputer, or the like. The processor 120 may preferably perform real time processing, but is not limited thereto.

For example, the processor 120 may acquire the profile data of the user, control the display 111 to display the basic UI corresponding to the function of the vehicle based on the acquired profile data of the user, and control a function of the vehicle corresponding to the basic UI according to an input user manipulation when the user manipulation is input to the input device 110.

The profile data of the user may include information on a function of the vehicle preset by the user. For example, the profile data of the user may include setting information regarding the basic UI, that is, setting information of the user regarding which of the above-described various functions of the vehicle is displayed on which of the electronic apparatuses 100-1, 100-2 and 100-3 as the basic UI.

The functions of the vehicle that may be displayed as the basic UI may include various functions provided by the vehicle control system 300 described above.

For example, the user may set the voice agent function as the basic function to be displayed on the electronic apparatus 1 100-1, set the clock function as the basic function to be displayed on the electronic apparatus 2 100-2, and set the HVAC temperature adjusting function as the basic function to be displayed on the electronic apparatus 3 100-3.

Based on the profile data of the user, a UI corresponding to the voice agent function may be displayed on the electronic apparatus 1 100-1, a UI corresponding to the clock function may be displayed on the electronic apparatus 2 100-2, and a UI corresponding to the HVAC temperature adjusting function may be displayed on the electronic apparatus 3 100-3.

In the above-described example, it has been described that among the functions provided by the vehicle control system 300, the function of the vehicle to be displayed as the basic UI is set. However, the function of the vehicle to be displayed as the basic UI is not limited, and according to an embodiment, among the functions provided by the IVI system 200, the function of the vehicle to be displayed as the basic UI may also be set.

According to an embodiment, the processor 120 may acquire the profile data of the user from a memory (not illustrated) included in the electronic apparatus 100, and may also receive and acquire the profile data of the user from an external device (e.g., a mobile device of the user).

The processor 120 may acquire the profile data of the user, control the display 111 to display the basic UI based on the setting information regarding the basic UI included in the acquired profile data of the user, and control the function of the vehicle corresponding to the basic UI according to a user manipulation input to the input device 110 while the basic UI is displayed.

More details regarding the setting of the basic UI and the function control of the vehicle corresponding to the basic UI will be described in greater detail below with reference to FIG. 5.

According to an embodiment of the disclosure, if the vehicle is started up, e.g., when a start mode is turned on, the processor 120 may display an initial UI. The start mode may refer, for example, to an operation in which an engine of the vehicle is started up, unlike an accessory (ACC) mode or an on mode, which will be described in greater detail below.

For example, if the vehicle is started up, the processor 120 may first control the display 111 to display the initial UI based on the profile data of the user before displaying the basic UI described above.

The initial UI is a UI that is first displayed on the display 111 after the vehicle is started up and before the basic UI described above is displayed, and may include a UI for user selection and a UI corresponding to a function frequently used when the vehicle is started up, which will be described later.

For example, because the basic UI is based on the profile data of the user, it may be necessary to first determine whether to display the basic UI based on the profile data of which of the plurality of users, and it may be necessary to consult convenience of the user by first displaying the function frequently used by the user after the vehicle is started up in priority over other functions. As a result, the processor 120 may control the display 111 to display the initial UI before displaying the basic UI after the vehicle is started up.

Because such an initial UI may also be set by the user, the profile data of the user may include user setting information regarding the initial UI. For example, the profile data of the user may include information set by the user about which of the various functions of the vehicle is to be displayed on which of the plurality of electronic apparatuses 100-1 to 100-3 as the initial UI.

The functions of the vehicle that may be displayed as the initial UI may include, for example, a user selection function for selecting the profile data and a function preset as the function that is frequently used by the user when the vehicle is started up among various functions provided by the IVI system 200 described above.

For example, the user may set a user selection function to the electronic apparatus 1 100-1, set a navigation function to the electronic apparatus 2 100-2, and set a multimedia function to the electronic apparatus 3 100-3, respectively, as the initial UI.

If the vehicle is started up, a UI for user selection may be displayed on the electronic apparatus 1 100-1, a UI corresponding to the navigation function may be displayed on the electronic apparatus 2 100-2, and a UI corresponding to the multimedia function may be displayed on the electronic apparatus 3 100-3, respectively, before the basic UI is displayed.

In the above-described example, it has been described that among the functions provided by the IVI system 200, the function that is frequently used when the vehicle is started up is set. However, the function that is frequently used when the vehicle is started up is not limited, and according to an embodiment, among the functions provided by the vehicle control system 300, the function that is frequently used when the vehicle is started up may also be set.

If a preset time elapses without manipulation on the input device 110 while the initial UI is displayed or the function frequently used by the user when the vehicle is started up, which is executed through the initial UI, is terminated, the processor 120 may display the basic UI based on the profile data of the user.

For example, in the case in which the initial UI is the UI for user selection, the processor 120 may control the display 111 to display the UI for user selection when the vehicle is started up, and may control the display to display a basic UI corresponding to a function of the vehicle which is set for a previously selected user based on profile data of the previously selected user, when the input device 110 is not manipulated and the preset time elapses while the UI for user selection is displayed on the display 111.

For example, if the basic UI is most recently displayed on the electronic apparatus 100 based on the profile data of the user A and the driving of the vehicle is terminated, the processor 120 may display the initial UI based on the profile data of the user A, who is the previously selected user, when the vehicle is then started up. When the user selection function is set as the function to be displayed on the electronic apparatus 100 at the time of starting up the vehicle, in the profile data of the user A, the processor 120 may display the UI for user selection when the vehicle is started up.

Even when the UI for user selection is not set as the initial UI in the profile data of the user A, if the UI for user selection is set to be displayed as a default at the time of starting up the vehicle according to an embodiment, the processor 120 may display the UI for user selection when the vehicle is started up.

Accordingly, if the input device 110 is not manipulated and the preset time elapses while the UI for user selection is displayed on the display 111, the processor 120 may control the display 111 to display the basic UI set for the user A based on the profile data of the user A. In this case, the preset time may be, for example, about 10 seconds or 20 seconds, but is not limited thereto and may be set to any other time.

If the input device 110 is manipulated while the UI for user selection is displayed on the display 111, and the user is newly selected, the processor 120 may control the display to display a basic UI corresponding to a function of the vehicle set for the newly selected user based on profile data of the newly selected user.

For example, if the user manipulates the input device 110 to select a user B while the UI for user selection is displayed on the display 111, the processor 120 may control the display 111 to display a basic UI set for the user B based on profile data of the user B.

As such, the user may change the profile data by changing the user through the UI for user selection among the initial UIs. Accordingly, the electronic apparatus 100 may provide a personalized service for each user.

If the initial UI is the UI corresponding to the function frequently used at the time of starting up the vehicle, the processor 120 may display the UI corresponding to the function frequently used by the user at the time of starting up the vehicle among the functions of the vehicle based on the profile data of the user when the vehicle is started up.

If the input device 110 is manipulated while the UI corresponding to the function frequently used by the user at the time of starting up the vehicle is displayed on the display 111, the processor 120 may control the IVI system 200 or the vehicle control system 300 to execute the function frequently used by the user at the time of starting up the vehicle by transmitting a command for executing the function frequently used by the user at the time of starting up the vehicle to the IVI system 200 or the vehicle control system 300.

If the input device 110 is not manipulated and the preset time elapses while the UI corresponding to the function frequently used by the user at the time of starting up the vehicle is displayed on the display, the processor 120 may control the display 111 to display a basic UI corresponding to a function of the vehicle set for the user based on the profile data of the user. In this case, the preset time may be, for example, about 10 seconds or 20 seconds, but is not limited thereto and may be set to any other time.

The function frequently used by the user at the time of starting up the vehicle may be a function preset as the function to be displayed as the initial UI, among the functions provided by the IVI system 200 disposed in the vehicle or the functions provided by the vehicle control system 300 disposed in the vehicle as described above.

According to an embodiment of the disclosure, even when the function frequently used at the time of starting up the vehicle, which is executed as described above, is terminated, the processor 120 may control the display 111 to display the basic UI based on the profile data of the user.

As such, before the basic UI is displayed on the display 111, the initial UI corresponding to the function frequently used by the user at the time of starting up the vehicle is first displayed, such that the user may manipulate a desired function of the vehicle more conveniently and quickly.

According to an embodiment of the disclosure, if the vehicle is started up, three users registered in the profile data for each user may be first displayed on the plurality of electronic apparatuses 100-1, 100-2 and 100-3 before displaying the initial UI, and if one of the displayed three users is selected through a push manipulation for one of the plurality of electronic apparatuses 100-1, 100-2 and 100-3, the basic UI may be displayed based on profile information of the selected user. In this case, if a preset time elapses (e.g., 5 seconds) without user manipulation while the three registered users are displayed on the plurality of electronic apparatuses 100-1, 100-2 and 100-3, respectively, the initial UI described above may also be displayed.

In the above, the example in which the initial UI is displayed when the vehicle is started up has been described. However, the embodiment is not limited thereto.

For example, according to an embodiment of the disclosure, if the accessory (ACC) mode, in which power is supplied to some electronic apparatuses in the vehicle by battery power only, is turned on, the processor 120 may control the display 111 to display the initial UI described above.

In addition, according to another embodiment of the disclosure, if the on mode in which the engine is not started up but the power is supplied to all electronic apparatuses in the vehicle is turned on, the processor 120 may also control the display 111 to display the initial UI described above.

The processor 120 may change the basic UI displayed on the display 111 to another UI by reflecting the context of the user. For example, the context of the user may, for example, and without limitation, be any one of (1) a context in which a user manipulation for other electronic apparatuses (e.g., when the electronic apparatus 100 is the electronic apparatus 2 100-2 described in FIG. 2, other electronic apparatuses may be the electronic apparatus 1 100-1 and the electronic apparatus 3 100-3) disposed in the vehicle is input, and (2) a context in which one of the plurality of functions provided by the IVI system is executed, while the basic UI is displayed.

For example, if a user manipulation for an input device of another electronic apparatus disposed in the vehicle is input while the basic UI is displayed on the display 111, the processor 120 may control the display 111 to change the basic UI to a UI associated with a user manipulation for the input device of another electronic apparatus.

For example, if the user manipulation for the input device of another electronic apparatus is input while the first basic UI corresponding to the first function of the vehicle is displayed on the display 111 and the second basic UI corresponding to the second function of the vehicle is displayed on a display of another electronic apparatus in the vehicle based on the profile data of the user, the processor 120 may control the display 111 to change the first basic UI to the third UI corresponding to the function associated with the second function.

According to an embodiment of the disclosure, if the user manipulates the electronic apparatus 3 100-3 while a basic UI corresponding to the voice agent function is displayed on the electronic apparatus 1 100-1, a basic UI corresponding to the clock function is displayed on the electronic apparatus 2 100-2, and a basic UI corresponding to the HVAC temperature adjusting function is displayed on the electronic apparatus 3 100-3, respectively, based on the profile data of the user, the electronic apparatus 1 100-1 may change the basic UI corresponding to the voice agent function to a UI corresponding to a HVAC air volume adjusting function, which is a function associated with the HVAC temperature adjusting function, and the electronic apparatus 2 100-2 may change the basic UI corresponding to the clock function to a UI corresponding to a HVAC mode adjusting function, which is a function associated with the HVAC temperature adjusting function. In the above example, the electronic apparatus 1 100-1 or the electronic apparatus 2 100-2 is the electronic apparatus 100 of FIG. 3, and the electronic apparatus 3 100-3 is another electronic apparatus.

Accordingly, the user may immediately manipulate the function of the vehicle corresponding to the changed UI through the changed UI. That is, the user may immediately use the functions of the vehicle associated with a manipulated basic function by manipulating one basic function while the basic functions are displayed on the plurality of electronic apparatuses 100-1 to 100-3.

According to an embodiment of the disclosure, if the user manipulation is no longer input while the changed UI is displayed on the display 111 of the electronic apparatus 100, the display 111 of the electronic apparatus 100 may return to the basic UI previously displayed.

For example, if the input device of the electronic apparatus 100 and the input device of another electronic apparatus are not manipulated and a preset time elapses while the UI associated with the user manipulation for the input device of another electronic apparatus is displayed on the display 111, the processor 120 may control the display 111 to change the UI associated with to the user manipulation back to the basic UI. The preset time may be, for example, about 10 seconds or 20 seconds, but is not limited thereto and may be set to any other time.

In addition, if one of the plurality of functions provided by the IVI system 200 disposed in the vehicle is executed while the basic UI is displayed on the display 111, the processor 120 may control the display 111 to change the basic UI being displayed to a UI corresponding to a function associated with the executed one function.

Even when one function is executed through an input interface separately provided in the IVI system 200 as well as one function is executed through the input device of any one of the plurality of electronic apparatuses 100-1, 100-2 and 100-3, the processor 120 may control the display 111 to change the basic UI being displayed to the UI corresponding to the function associated with the executed one function.

If one function executed in the IVI system 200 is terminated, the processor 120 may control the display 111 to change the UI being displayed corresponding to the associated function back to the basic UI that was previously displayed. In addition, according to an embodiment, if a predetermined time elapses without subsequent manipulation after the user manipulation for the UI being displayed corresponding to the associated function, the processor 120 may also control the display 111 to display the basic UI that was previously displayed.

As such, by changing the functions displayed on the plurality of electronic apparatuses 100-1 to 100-3 disposed in the vehicle in consideration of the context of the user, the user may more easily and conveniently manipulate the desired function of the vehicle.

According to an embodiment of the disclosure, the profile data of the user may include information about a destination preset as a favorite place of the user. For example, the information about the destination may include location information of the destination or address information of the destination.

Therefore, if the navigation function provided by the IVI system 200 disposed in the vehicle is executed, the processor 120 may control the display 111 to display a UI for selecting one of a plurality of preset destinations based on the profile data of the user.

Accordingly, if the destination is selected on the UI for selecting the destination through the manipulation of the input device 110, the processor 120 may transmit information about the selected destination to the IVI system.

While the navigation function is executed, a UI indicating a function associated with the navigation function (e.g., a zoom in/zoom out function, etc.) may be displayed on another electronic apparatus.

According to another embodiment of the disclosure, the profile data of the user may include information about a contact address previously set as a contact address with which the user frequently contacts. For example, the information about the contact address may include name information of an acquaintance or phone number information of an acquaintance.

If the call function provided by the IVI system 200 disposed in the vehicle is executed, the processor 120 may control the display 111 to display a UI for selecting one of a plurality of preset contact addresses based on the profile data of the user.

If the contact address is selected on the UI for selecting the contact address through the manipulation of the input device 110, the processor 120 may transmit information about the selected contact address to the IVI system 200.

In the above example, it has been described that the IVI system 200 provides the call function, but the execution of the call function is not limited thereto, and even when the call function is executed by other external devices (e.g., a smartphone, a PDA, a tablet, and the like of the user) having the call function in the vehicle, the same operation as that as described above may be performed.

If the call function is terminated, the processor 120 may control the display 111 to return to the basic UI that was originally displayed.

According to another embodiment of the disclosure, the profile data of the user may include information about a device previously set as an Internet of Things (IoT) device for remote control. In this case, the information about the device may include information about the name, location, function, etc. of the device.

If the vehicle is located within a preset distance from the destination set in the navigation function executed in the IVI system 200, the processor 120 may control the display 111 to display a UI for selecting the IoT device based on the profile data of the user.

For example, in a case in which the destination of navigation is set to "home", if the vehicle is located within a preset distance from the "home", the processor 120 may display a UI for selecting an IoT device to be remotely controlled by the user among the IoT devices in the "home". For example, the preset distance may be, for example, about 5 kilometers or 10 kilometers, but is not limited thereto and may be set to any other range.

If the IoT device is selected on the UI for selecting the IoT device through the manipulation of the input device 110, the processor 120 may control the display 111 to display a UI for controlling the selected IoT.

The user may remotely control a desired IoT device through the UI for controlling the IoT device. For example, the user may also remotely adjust the temperature of the house or operate a robot cleaner.

If the UI for selecting the IoT device or the UI for controlling the IoT device is displayed and a predetermined time elapses without any manipulation, or if a predetermined time elapses after the manipulation of the user on the UI for controlling the IoT device, the processor 120 may control the display 111 to return to the basic UI that was originally displayed.

According to another embodiment of the disclosure, the profile data of the user may include setting information about a function frequently used by the user during driving. For example, the function frequently used by the user during driving may include a function preset as that frequently used by the user during driving among the functions provided by the IVI system 200 or the vehicle control system 300.

The processor 120 may control the display 111 to display a UI corresponding to the function frequently used by the user during driving on at least one region of the display 111 on which the basic UI is displayed, based on the profile data of the user.

If the basic UI and the UI corresponding to the function frequently used by the user during driving are together displayed on the display 111, the processor 120 may control the function of the vehicle corresponding to the basic UI when the first manipulation for the input device 110 is input, and may transmit a command for executing the function frequently used by the user during driving to the IVI system 200 or the vehicle control system 300 when the second manipulation for the input device 110 is input.

For example, if the basic UI and the UI corresponding to the function frequently used by the user during driving are together displayed on the display 111, the processor 120 may perform an operation for controlling the function of the vehicle corresponding to the basic UI when a rotation manipulation or a single push manipulation for the input device 110 is input, and may perform an operation for executing the function frequently used by the user during driving when two push manipulations are input within a preset time for the input device 110.

As described above, according to the embodiments of the disclosure, the functions preferred by the user may be separately set to the functions frequently used at the time of starting up the vehicle and the functions frequently used during driving described above. Therefore, the preferred functions are appropriately provided to the user at appropriate time, thereby improving convenience of the user manipulation.

According to still another embodiment of the disclosure, the electronic apparatus 100 may operate to interlock with an external mobile device. For example, the processor 120 may receive the profile data of the user from the external mobile device and control the display 111 to display the basic UI based on the received profile data of the user.

For example, the electronic apparatus 100 and the external mobile device may communicate with each other through a short range communication method, for example, and without limitation, a near field communication (NFC) method, a Bluetooth method, or the like. Therefore, if the profile data of the user is stored in the external mobile device, for example, the external mobile device is tagged to the electronic apparatus 100, the electronic apparatus 100 may receive the profile data of the user from the external mobile device through the NFC. Accordingly, the processor 120 may perform various operations described above based on the profile data of the user acquired from the external mobile device.

Information received from an external mobile device and available to the electronic apparatus 100 is not limited to the profile data of the user. For example, the electronic apparatus 100 may receive a UI theme of the mobile device, the favorite destination, contact address information, or the like, display the theme of UI elements displayed on the display 111 in synchronization with the UI theme of the mobile device based on the above reception, or provide the favorite destination information, the contact address information, or the like to the IVI system 200, such that the in-vehicle system may also provide an experience synchronized with the mobile device to the user.

In addition, if information about content being played on the external mobile device is received from the external mobile device, the processor 120 may transmit the received information about the content to the IVI system 200 disposed in the vehicle. Accordingly, the IVI system 200 may play the content being played on the external mobile device based on the information received from the electronic apparatus 100.

For example, the user may watch TV broadcast of a channel A on the external mobile device and then board the vehicle to tag the mobile device to the electronic apparatus 100. For example, the processor 120 may receive information about the content being played on the external mobile device from the external mobile device and transmit the received information to the IVI system 200.

The IVI system 200 may subsequently play the TV broadcast of the channel A, which is being played on the mobile device, through the display provided in the IVI system 200, based on the information received from the electronic apparatus 100.

Figure 4:
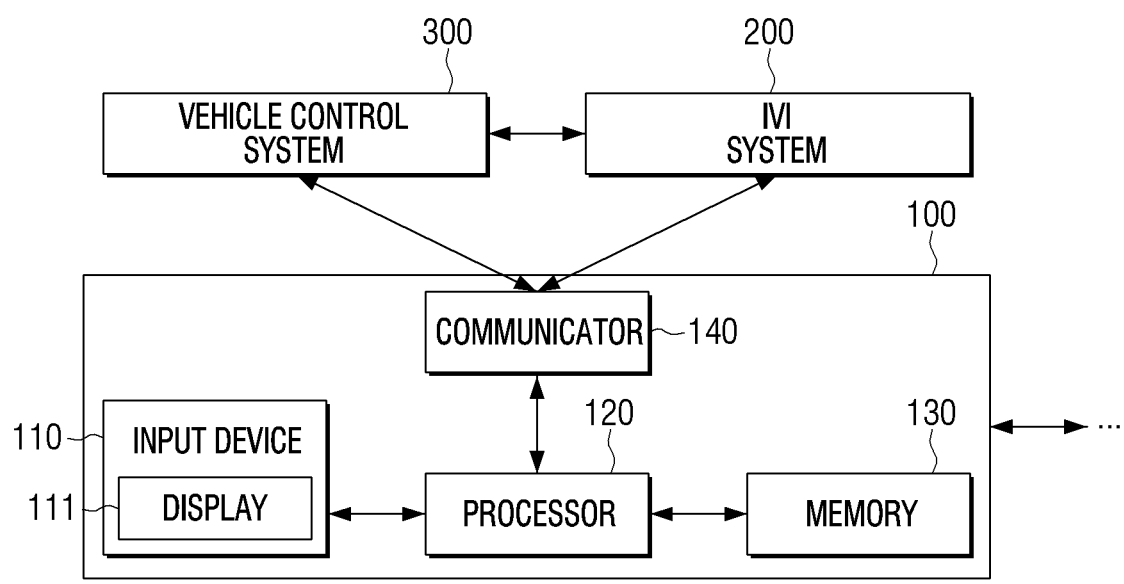
FIG. 4 is a block diagram illustrating an example electronic apparatus according to an embodiment of the disclosure.

FIG. 4 is a block diagram illustrating the example electronic apparatus according to an embodiment of the disclosure. Referring to FIG. 4, the electronic apparatus 100 may include an input device (e.g., including input circuitry) 110 including a display 111, a processor (e.g., including processing circuitry) 120, a memory 130, and a communicator (e.g., including communication circuitry) 140. The electronic apparatus 100 of FIG. 4 may be one of the plurality of electronic apparatuses 100-1, 100-2 and 100-3 described above.

The communicator 140 (or a communication interface 140) may include various communication circuitry and generate communication paths between external devices (e.g., the vehicle control system 300, the IVI system 200, another electronic apparatus (knob), the mobile device, and the like) and the electronic apparatus 100.

The communicator 140 may support a designated protocol that may be connected to the external devices by a wired or wireless manner. For example, the communicator 140 may include a module including various communication circuitry for at least one of, for example, and without limitation, controller area network (CAN) communication, Bluetooth communication, Bluetooth low energy (BLE) communication, wireless fidelity (Wi-Fi) communication, cellular (or mobile) communication, near field communication (NFC), wired communication, or the like.

In addition, the communicator 140 may include various communication interface circuitry, such as, for example, and without limitation, a high definition multimedia interface (HDMI), a universal serial bus (USB) interface, an SD card interface, an audio interface in association with a connection terminal such as a HDMI connector, a USB connector, an SD card connector, an audio connector (e.g., headphone connector), or the like.

The communicator 140 may provide information or data received from the external devices through the communication paths to the processor 120. In addition, the communicator 140 may transmit the information or data provided from the processor 120 to the external devices through the communication paths.

The memory 130 (or a storage 130) may, for example, and without limitation, store instructions, control instruction codes, control data, or user data for controlling the electronic apparatus 100. For example, the memory 130 may include an application, an operating system (OS), middleware, and a device driver.

For example, the memory 130 may store profile data for each user. The profile data for each user is profile data including information preset for various functions of the vehicle for each user.

For example, the profile data for each user may include setting information on the basic UI displayed on each of the plurality of electronic apparatuses 100-1, 100-2 and 100-3 disposed in the vehicle, setting information on the initial UI displayed on each of the plurality of electronic apparatuses 100-1, 100-2 and 100-3 at the time of staring the vehicle, information about a destination preset as a favorite place of the user, information about a contact address preset as a contact address with which the user frequently contacts, information about a device preset as an IoT device for remote control, setting information on a function frequently used by the user during driving, and the like. In addition, the profile data for each user may include information preset by each user about the position of the seat or the position of the mirrors.

In addition, the memory 130 may store data for displaying various UIs described above, a mapping table (e.g., Table 1 below) about a related UI set when UIs related each other are displayed on the plurality of electronic apparatuses 100-1, 100-2 and 100-3 according to a context of the user, and the like.

The memory 130 may include, for example, and without limitation, one or more of a volatile memory and/or a non-volatile memory. The volatile memory may include, for example, and without limitation, a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), and the like. The nonvolatile memory may include, for example, and without limitation, a read only memory (ROM), a programmable ROM (PROM), an electrically programmable ROM (EPROM), an electrically erasable programmable ROM (EEPROM), a flash memory, and the like.

The memory 130 may also include a non-volatile medium such as a hard disk drive (HDD), a solid state disk (SSD), an embedded multi media card (eMMC), or a universal flash storage (UFS).

The input device 110 (or an input interface 110) may include various input circuitry and receive a user manipulation with respect to the electronic apparatus 100. For example, the input device 110 may receive a push manipulation and a rotation manipulation of the user. The input device 110 may include a body part configured to be rotatable and pushable and a display 111 disposed on the body part.

For example, the input device 110 may include a cylindrical housing including a circular display 111 on one surface thereof and configured to detect the push manipulation, and a rotatable structure having a ring shape to surround the circular display 111 and configured to detect the rotation manipulation. The housing and the rotatable structure may correspond to the body part (e.g., the body). However, a configuration example of the input device 110 is not limited thereto.

The display 111 disposed on the input device 110 may be fixed in a predetermined posture without being affected by the rotation of the body part. For example, the display 111 may maintain the predetermined posture without rotating together, for example, even if the rotatable structure is rotated. Therefore, various UIs described above displayed on the display 111 may not rotate together with the rotation of the input device 110. However, the embodiment is not limited thereto.

The processor 120 may include various processing circuitry and control an overall operation of the electronic apparatus 100. The processor 120 may include one processor or one processor core (single core) or include a plurality of processors or processor cores. For example, the processor 120 may include a multi-core such as a dual-core, a quad-core, and a hexa-core. According to an embodiment, the processor 120 may further include a cache memory located internally or externally.

The processor 120 may receive commands of other components of the electronic apparatus 100, interpret the received commands, and perform calculation or process data according to the interpreted commands.

The processor 120 may process data or signals generated or occurring in an application. For example, the processor 120 may request instructions, data, or signals to the memory 130 to execute or control the application. The processor 120 may write (or store) or update the instructions, the data, or the signals in the memory 130 to execute or control the application.

The processor 120 may interpret and process messages, data, instructions, or signals received from the input device 110, the display 111, the memory 130, and the communicator 140. In addition, the processor 120 may generate new messages, data, instructions, or signals based on the received messages, data, instructions, or signals. The processor 120 may provide the processed or generated messages, data, instructions, or signals to the input device 110, the display 111, the memory 130, and the communicator 140.

All or part of the processor 120 may be electrically or operably coupled with or connected to other components (e.g., the input device 110, the display 111, the memory 130, and the communicator 140) in the electronic apparatus 100.

According to embodiments, the processor 120 may be configured as one or more processors. For example, and without limitation, the processor 120 may include an application processor (AP) for controlling a program of an upper layer such as an application program, a communication processor (CP) for performing a control for communication, etc.

Although not illustrated in the drawings, the electronic apparatus 100 may further include a haptic actuator, a speaker, a camera, and the like, according to an embodiment. The haptic actuator may provide a haptic effect to the input device 110 so that the user may cause an intended input through a tactile sense.

The IVI system 200 and the vehicle control system 300 may include the components (e.g., the display, the user input interface, the processor, etc.) necessary for providing the user with various functions of the vehicle described above with reference to FIG. 1A. Details of the configuration of the IVI system 200 and the vehicle control system 300 are not overly important to the disclosure, and a description thereof will be thus not be provided here.

An operation of the processor 120 or the electronic apparatus 100 according to diverse embodiments of the disclosure will be described in greater detail below with reference to FIGS. 5 through 17. In the description of FIGS. 5 to 17, detailed descriptions of contents overlapping with those described above may not be repeated.

Figure 5:
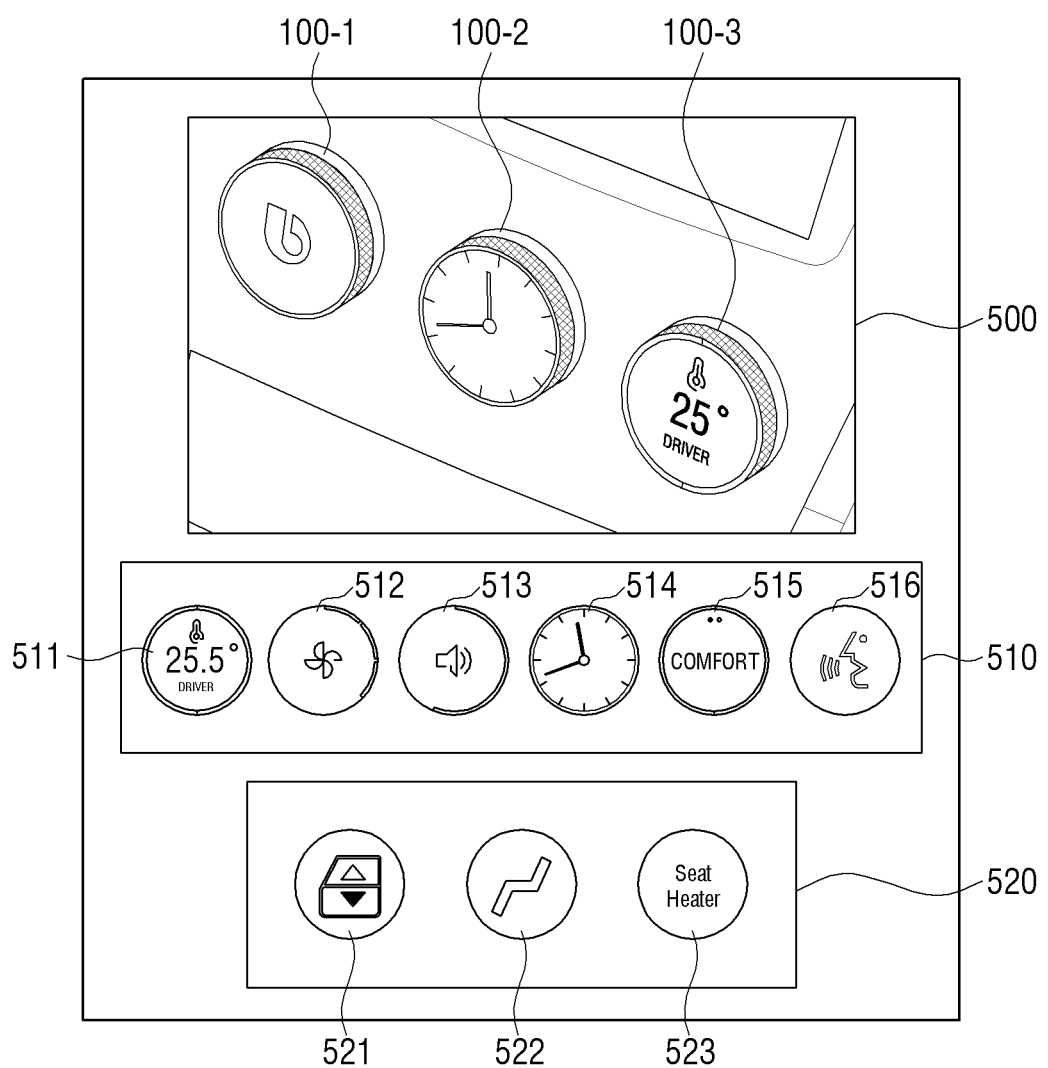
FIG. 5 is a diagram illustrating example basic user interfaces (UIs) corresponding to functions of a vehicle which may be set to each user according to an embodiment of the disclosure.

FIG. 5 is a diagram illustrating example basic user interfaces (UIs) corresponding to functions of a vehicle which may be set to each user according to an embodiment of the disclosure.

According to an embodiment of the disclosure, as illustrated in reference numeral 500, the plurality of electronic apparatuses 100-1, 100-2 and 100-3 disposed in the vehicle may display basic UIs based on the profile data of the user.

The basic UIs may, for example, be UIs indicating functions of the vehicle which are allocated to each of the plurality of electronic apparatuses 100-1, 100-2, and 100-3 based on the profile data of the user among the various functions of the vehicle, and may refer to UIs which are displayed on the plurality of electronic apparatuses 100-1, 100-2, and 100-3 after the vehicle is started up, except when an initial UI or another UI is displayed in a specific context.

Reference numeral 510 is an example of the functions of the vehicle that may be set as the basic UIs, and illustrates an HVAC temperature adjusting function 511, an HVAC air volume adjusting function 512, a volume adjusting function 513, a clock function 514, a driving mode setting function 515, and a voice agent function 516.

Reference numeral 520 is an extension example of the functions of the vehicle that may be set as the basic UIs and illustrates that functions such as a window and sunroof control function 521, a seat position adjusting function 522, and a seat temperature adjusting function 523 may also be set as the basic UIs according to an embodiment.

Therefore, the user may set which of the plurality of functions illustrated in reference numerals 510 and 520 is displayed as the basic UI on which of the plurality of electronic apparatuses 100-1, 100-2 100-3, and may register the set functions in the profile data of the user.

The setting and the registration of the basic UIs may be performed through the electronic apparatus 100 or the IVI system 200. For example, when the basic UIs are set through the electronic apparatus 100, the user may set the basic UIs by manipulating the input device 110 in a given method. For example, if the input device 110 is manipulated to be pushed for a predetermined time or more, the processor 120 may control the electronic apparatus 100 to operate in a basic UI setting mode. If the input device 110 is manipulated to be rotated in the basic UI setting mode, the processor 120 may control the display 111 to display functions of the vehicle that may be set as the basic UIs according to the rotation manipulation. Accordingly, if the input device 110 is manipulated to be pushed while a specific function is displayed, the processor 120 may set a function displayed on the display 111 when the input device 110 is manipulated to be pushed in the basic UI setting mode as the basic UI to be displayed on the electronic apparatus 100.

When the basic UIs are set through the IVI system 200, the user may set the basic UIs by manipulating the IVI system 200. For example, if the basic UI setting menu displayed on a screen of the IVI system 200 is selected, the IVI system 200 may display a UI screen for setting the basic UIs The UI screen for setting the basic UIs may include a list of the functions of the vehicle that may be set as the basic UIs as in reference numeral 510 or 520, and UIs corresponding to the electronic apparatuses to which the functions of the vehicle are allocated. Accordingly, the user may set the basic UI by allocating (e.g., dragging and dropping) a specific function included in the UI screen for setting the basic UIs to a specific electronic apparatus.

The processor 120 included in each of the plurality of electronic apparatuses 100-1, 100-2 100-3 may control the display 111 included in each of the plurality of electronic apparatuses 100-1, 100-2, 100-3 to display a basic UI corresponding to the function of the vehicle set for the user based on basic UI setting information included in the profile data of the user.

Accordingly, if the user manipulation for the basic UI is input, the processor 120 may control the function of the vehicle corresponding to the displayed basic UI by controlling the communicator 140 to transmit a control command according to the input user manipulation to the IVI system 200 or the vehicle control system 300.

For example, in the example of reference numeral 500 of FIG. 5, the user may use the voice agent function provided by the IVI system 200 or the vehicle control system 300 by manipulating the input device 110 of the electronic apparatus 1 100-1 to be pushed. In addition, the user may adjust an internal temperature of the vehicle through the HVAC temperature adjusting function provided by the vehicle control system 300 by manipulating the input device 110 of the electronic apparatus 3 100-3 to be rotated.

Reference numerals 510 and 520 of FIG. 5 illustrate the functions provided by the vehicle control system 300, but the embodiment is not limited thereto, and as described above, the functions provided by the IVI system 200 may also be set as the basic UIs.

Figure 6:
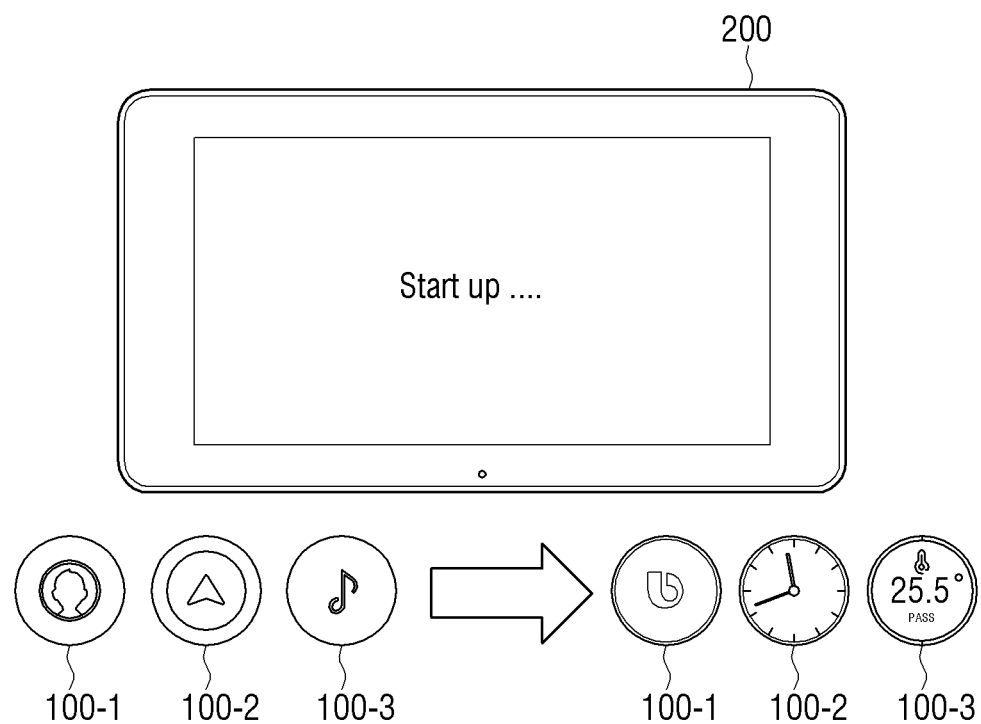
FIG. 6 is a diagram illustrating an example operation after starting up a vehicle according to an embodiment of the disclosure.

FIG. 6 is a diagram illustrating an example operation after starting up a vehicle according to an embodiment of the disclosure. The IVI system 200 of FIG. 6 illustrates that the vehicle is starting up. When the vehicle is started up, the processor 120 may control the display 111 to display the initial UIs on the plurality of electronic apparatuses 100-1, 100-2, 100-3 based on the profile data of the user.

The initial UIs may be UIs that are displayed on the display 111 after the vehicle is started up and before the basic UIs are displayed, and may include a UI for user selection and a UI corresponding to a function of the vehicle preset by the user as a function frequently used at the time of starting up the vehicle.

The left side of the arrow in FIG. 6 illustrates the initial UIs displayed on each of the plurality of electronic apparatuses 100-1, 100-2, 100-3. Referring to FIG. 6, as the initial UIs, the electronic apparatus 1 100-1 displays a UI for user selection, the electronic apparatus 2 100-2 displays a UI corresponding to the navigation function, and the electronic apparatus 3 100-3 displays a UI corresponding to the multimedia function.

The user may set the functions of the vehicle to be displayed as the initial UIs as the time of starting up the vehicle and may register the set functions in the profile data of the user, and the processor 120 displays the initial UIs on the display 111 based on the profile data of the user. Therefore, in the example of FIG. 6, the user may know that a user selection function for profile selection is set in the electronic apparatus 1 100-1, the navigation function as the function frequently used at the time of starting up the vehicle is set in the electronic apparatus 2 100-2, and the multimedia function as the function frequently used at the time of starting up the vehicle is set in the electronic apparatus 3 100-3, respectively, as the functions to be displayed as the initial UIs.

In this case, the setting and the registration of the initial UIs may be performed through the electronic apparatus 100 or the IVI system 200 similarly to the setting and the registration of the basic UIs described above. For example, when the initial UIs are set through the electronic apparatus 100, the user may set the UIs through an initial UI setting mode by manipulating the input device 110 in a given method. In addition, when the initial UIs are set through the IVI system 200, the user may set the initial UIs through a UI screen for initial UI setting displayed on the IVI system 200.

The embodiment in which the initial UIs are displayed is not limited to the example described above. For example, an embodiment is also possible in which the UI for user selection is allocated to any one of the plurality of electronic apparatuses 100-1, 100-2, 100-3 by default, and the functions frequently used at the time of starting up the vehicle set by the user are allocated to only the remaining electronic apparatuses.

The user may control the functions of the vehicle corresponding to the initial UIs by manipulating the input device 110 while the initial UIs are displayed. For example, in a context in which the initial UIs are displayed as in the left side of the arrow in FIG. 6, the user may execute and control the user selection function for profile selection by manipulating the input device 110 of the electronic apparatus 100-1, execute and control the navigation function of the vehicle by manipulating the input device 110 of the electronic apparatus 2 100-2, and execute and control the multimedia function by manipulating the input device 110 of the electronic apparatus 3 100-3. In this case, in order to execute and control the functions of the vehicle provided by the IVI system 200, such as the navigation function and the multimedia function, the processor 120 may control the communicator 140 to transmit a control command according to the user manipulation to the IVI system 200.

While the initial UIs are displayed on the display 111, are terminated, if a preset time elapses without manipulation on the input device 110 or the functions frequently used by the user when the vehicle is started up, which are executed through the initial UIs, the processor 120 may display the basic UIs based on the profile data of the user. The right side of an arrow in FIG. 6 illustrates the basic UIs displayed on each of the plurality of electronic apparatuses 100-1, 100-2, 100-3 based on the profile data of the user.

For example, if a preset time elapses without user manipulation on the plurality of electronic apparatuses 100-1, 100-2, 100-3 while the initial UIs are displayed as in the left side of the arrow in FIG. 6, the processor 120 of each of the plurality of electronic apparatuses 100-1, 100-2, 100-3 may display the basic UIs as in the right side of the arrow in FIG. 6 based on the profile data of the user. The profile data of the user used to display the basic UIs may be the profile data of the user used to display the initial UIs or profile data of the user who was most recently selected, but is not limited thereto. For example, the profile data of the user set by default may be used to display the basic UIs.

If the user selection is completed through the UI for user selection displayed on the electronic apparatus 1 100-1 while the initial UIs are displayed as in the left side of the arrow in FIG. 6, the processor 120 of each of the plurality of electronic apparatuses 100-1, 100-2, 100-3 may display the basic UIs as in the right side of the arrow in FIG. 6 based on the profile data of the selected user. If a preset time elapses without any manipulation on the input device 110 while the UI for user selection is displayed, a user set as default or the user most recently selected may be selected as the user, and if the input device 110 is manipulated while the UI for user selection is displayed and a user is newly selected, the newly selected user may be selected as the user.

If the navigation function or the multimedia function executed through the user manipulation on the electronic apparatus 2 100-2 or the electronic apparatus 3 100-3 while the initial UIs are displayed as in the left side of the arrow in FIG. 6 is terminated, the processor 120 of each of the plurality of electronic apparatuses 100-1, 100-2, 100-3 may display the basic UIs as in the right side of the arrow in FIG. 6 based on the profile data of the user. The profile data of the user used to display the basic UIs may be the profile data of the user used to display the initial UIs or profile data of the user who was most recently selected, but is not limited thereto. For example, the profile data of the user set by default may be used to display the basic UIs.

As described above, if the basic UIs are displayed on the plurality of electronic apparatuses 100-1, 100-2, 100-3, the user may control the functions of the vehicle corresponding to the basic UIs displayed on the electronic apparatuses 100-1, 100-2, 100-3 by manipulating the plurality of electronic apparatuses 100-1, 100-2, 100-3.

Figure 7:
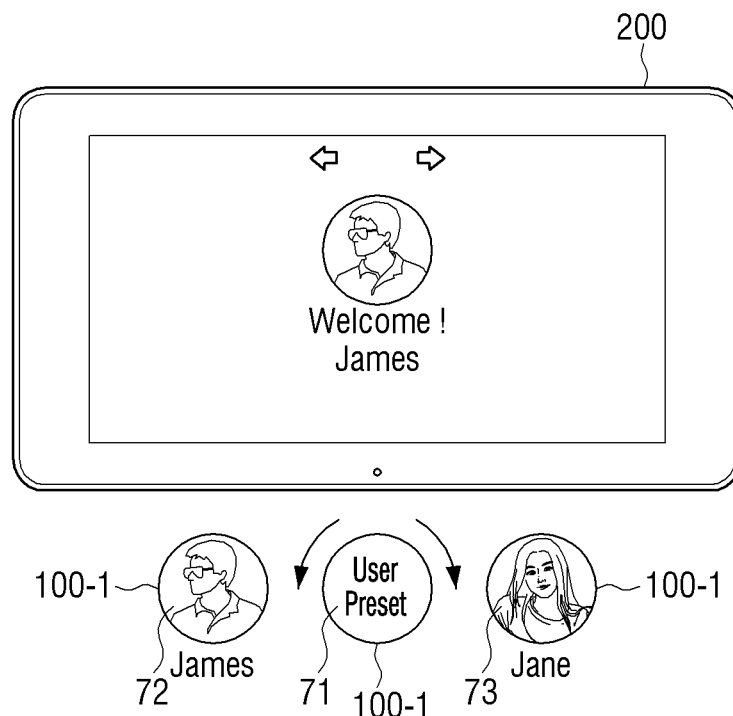
FIG. 7 is a diagram illustrating an example UI for user selection according to an embodiment of the disclosure.

FIG. 7 is diagram illustrating an example UI for user selection according to an embodiment of the disclosure.

As described above, if the vehicle is started up, the processor 120 may display the UI for user selection on the display 111 as the initial UI based on the profile data of the user. If the user is selected through the manipulation of the input device 110 while the UI for user selection is displayed on the display 111, the processor 120 may perform various operations including the displaying of the basic UI based on the profile data of the selected user.

FIG. 7 illustrates a state in which UIs 71, 72, and 73 for user selection are displayed on the electronic apparatus 1 100-1 of the plurality of electronic apparatuses 100-1, 100-2, 100-3 and a user James is selected according to a user manipulation.

The UIs for user selection may include a UI 71 indicating that the user may be selected by manipulating the electronic apparatus 100-1 and UIs 72 and 73 indicating users. Therefore, the user may recognize that the user may be selected through the current electronic apparatus 100-1 and may select the user by manipulating the electronic apparatus 100-1.

For example, if the input device 110 is manipulated to be pushed while the UI 71 indicating that the user may be selected by manipulating the electronic apparatus 100-1 is displayed, the processor 120 may control the display 111 to change and display the UIs 72 and 73 indicating the users according to the rotation of the input device 110, based on profile data for each of the plurality of users stored in the memory 130. For example, as illustrated in FIG. 7, the processor 120 may control the display 111 to display the UI 72 corresponding to the user James when the input device 110 is manipulated to be rotated in the left side, and to display the UI 73 corresponding to the user Jane when the input device 110 is manipulated to be rotated in the right side. In FIG. 7, a case in which the UIs indicating the users are a picture or a character is illustrated as an example, but the UI indicating the user may also be text such as "James" or "Jane" according to an embodiment.

If the input device 110 is manipulated to be pushed while the user James is displayed on the display 111, James is selected from the plurality of users, and the processor 120 may perform various operations such as displaying a basic UI based on profile data of the selected user James.

According to an embodiment, in a case in which information about a driver's seat position, side mirror & rear view mirror positions, etc. preset by James is registered in the profile data of James, if James is selected on the UI for user selection, the processor 120 may change the driver's seat position and the side mirror/rear view mirror positions of the vehicle through the vehicle control system 300 based on the profile data of James.

Figure 8:
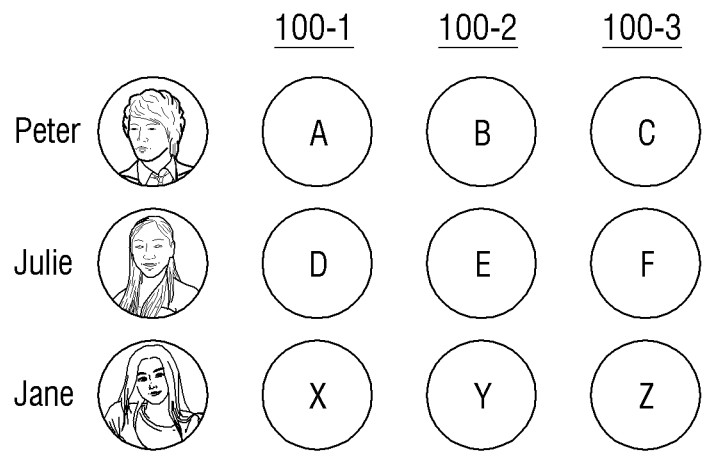

FIG. 8 is a diagram illustrating example profile data for each user according to an embodiment of the disclosure. For example, FIG. 8 illustrates that the functions of the vehicle allocated to the electronic apparatuses 1 to 3 100-1, 100-2, 100-3 (which may be referred to hereinafter as 100-1 to 100-3) are different for each user.

For example, as the functions to be displayed on each of the electronic apparatuses 1 to 3 (100-1 to 100-3) as the basic UIs, a user Peter may set a function A, a function B, and a function C to register as profile data, a user Julie may set a function D, a function E, and a function F to register as profile data, and a user Jane may set a function X, a function Y, and a function Z to register as profile data.

As described above, according to an embodiment of the disclosure, the user may register his/her personal settings for the functions of the vehicle as the profile data. The profile data of the users registered as described above may be selected through the UI for user selection as described above.

The initial UIs displayed on the display when the vehicle is started up as well as the basic UIs may be set for each user as illustrated in FIG. 8.

Figure 9:
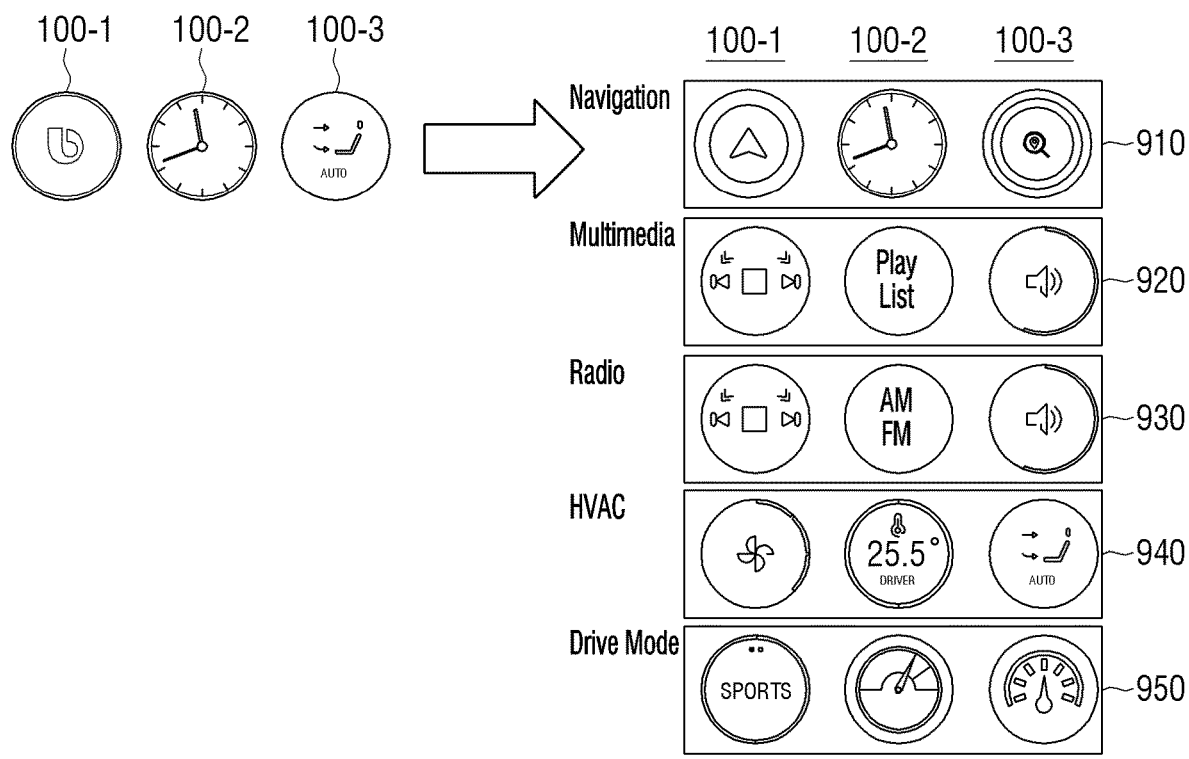
FIG. 9 is a diagram illustrating an example operation of displaying, by an electronic apparatus, an associated UI based on a context according to an embodiment of the disclosure.

FIG. 9 is a diagram illustrating example UI display operation associated with a context according to an embodiment of the disclosure. According to an embodiment of the disclosure, in a specific context, the plurality of electronic devices 100-1 to 100-3 may display UIs corresponding to functions of the vehicle associated with each other.

For example, if a specific function or a specific application of the vehicle is executed in the IVI system 200 or the vehicle control system 300 while the basic UIs are displayed on the plurality of electronic apparatuses 100-1 to 100-3 as in the left side of an arrow in FIG. 9, UIs related to the executed function or app may be displayed as in the right side of the arrow.

For example, if a navigation function (or navigation app) is executed in the IVI system 200 while the basic UIs are displayed on the plurality of electronic apparatuses 100-1 to 100-3, UIs corresponding to a destination setting function, a clock function, and a zoom in/out function related to the navigation function may be displayed on the plurality of electronic devices 100-1 to 100-3, respectively, as illustrated by reference numeral 910.

In addition, if a multimedia function is executed in the IVI system 200 while the basic UIs are displayed on the plurality of electronic apparatuses 100-1 to 100-3, UIs corresponding to a play adjusting function, a play list selection function, and a volume adjusting function related to the multimedia function may be displayed on the plurality of electronic devices 100-1 to 100-3, respectively, as illustrated by reference numeral 920.

In addition, if a radio function is executed in the IVI system 200 or the vehicle control system 300 while the basic UIs are displayed on the plurality of electronic apparatuses 100-1 to 100-3, UIs corresponding to a channel selection function, an AM/FM switching function, and a volume adjusting function related to the radio function may be displayed on the plurality of electronic devices 100-1 to 100-3, respectively, as illustrated by reference numeral 930.

In addition, if a HVAC function is controlled in the vehicle control system 300 while the basic UIs are displayed on the plurality of electronic apparatuses 100-1 to 100-3, UIs corresponding to an air volume adjusting function, a temperature adjusting function, and a fan mode adjusting function related to the HVAC function may be displayed on the plurality of electronic devices 100-1 to 100-3, respectively, as illustrated by reference numeral 940.

In addition, if a driving mode related function is controlled in the vehicle control system 300 while the basic UIs are displayed on the plurality of electronic apparatuses 100-1 to 100-3, UIs corresponding to a driving mode selection function, an oil pressure display function, and a power gauge display function may be displayed on the plurality of electronic devices 100-1 to 100-3, respectively, as illustrated by reference numeral 950.

The functions (or apps) executed or controlled in the IVI system 200 or the vehicle control system 300 while the basic UIs are displayed on the plurality of electronic apparatuses 100-1 to 100-3 may also be those executed or controlled through the manipulation on the electronic apparatus 100, and may also be those executed or controlled through a separate user interface provided in the IVI system 200 or the vehicle control system 300.

Table 1 below illustrates an example of the functions of the vehicle associated with each other described above. A mapping table of the associated functions illustrated in Table 1 below may be stored in the memory 130, and the processor 120 may perform the operation described above with reference to the stored mapping table stored in the memory 130.

The embodiment illustrating the associated functions of the vehicle is not limited to Table 1 below and may be set differently depending on the developer of the electronic apparatus 100 or the manufacturer of the vehicle.

TABLE 1

| Navigation | Destination | Clock | Zoom In/Zoom out |
|---|---|---|---|
| Multimedia | Pause/Stop Pre/Next/Seek | Play List Pre/Next | Volume |
| Radio | Channel | AM/FM Switch | Volume |
| HVAC | Fan Speed | Temperature | Fan Mode |
| Driving Mode | Drive mode | Oil Pressure | Power Gauge |

After the UIs for the functions associated with each other are displayed on the plurality of electronic apparatuses 100-1 to 100-3, respectively, as in the right side of the arrow in FIG. 9, if any user manipulation is not input to the plurality of electronic apparatuses 100-1 to 100-3 for a preset time, the execution of the functions (or apps) of the vehicle caused the display of the functions associated with each other is terminated, or a predetermined time elapses without additional subsequent manipulation after the user manipulation on the displayed functions associated with each other, it may return to the basic UIs on the left side of the arrow again as described above.

According to another embodiment of the disclosure, if any one of the plurality of electronic apparatuses 100-1 to 100-3 is manipulated by the user while the basic UIs are displayed on the plurality of electronic apparatuses 100-1 to 100-3, a UI corresponding to a function related to the function of the vehicle corresponding to the manipulated basic UI may be displayed on the remaining electronic apparatuses.

As an example, as in the left side of the arrow in FIG. 9, if the user manipulates the electronic apparatus 3 100-3 in a state in which the voice agent function is displayed on the electronic apparatus 1 100-1, the clock function is displayed on the electronic apparatus 2 100-2, and the HVAC fan mode adjusting function is displayed on the electronic apparatus 3 100-3, respectively, as the basic UIs, UIs corresponding to the air volume adjusting function and the temperature adjusting function, which are the functions related to the HVAC function, may be displayed on the electronic apparatus 1 100-1 and the electronic apparatus 2 100-2, respectively.

However, the embodiment is not limited thereto. For example, if the electronic apparatus 1 100-1 is manipulated while the basic UIs are displayed as in the left side of the arrow in FIG. 9, a UI corresponding to the function related to the voice agent function is displayed on the electronic apparatuses 2 and 3 (100-2 and 100-3).

Figure 10:
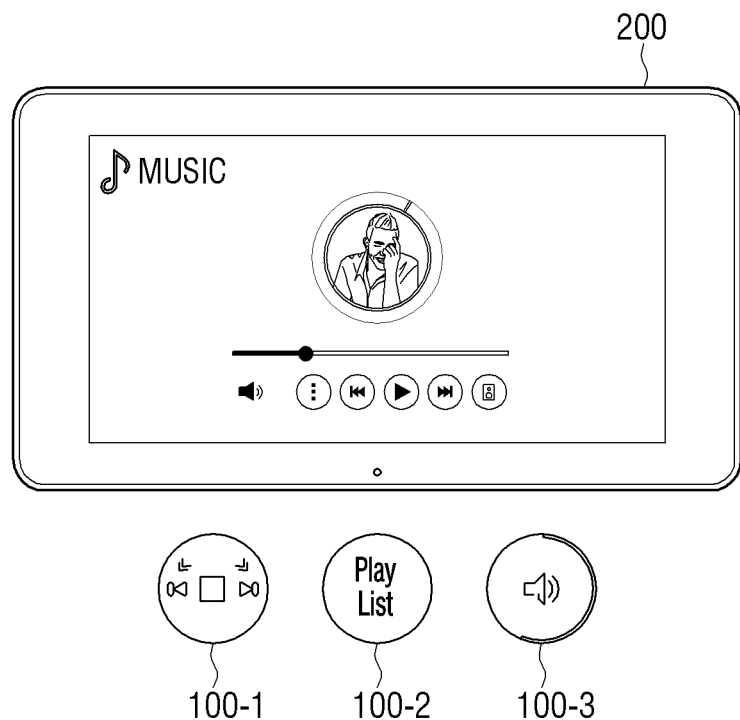
FIG. 10 is a diagram illustrating an example electronic apparatus displaying an associated UI according to a context according to an embodiment of the disclosure.

FIG. 10 is a diagram illustrating an example in which a UI associated with execution of a specific app is displayed. For example, the user may execute a music app on the IVI system 200 while the basic UIs as in the left side of the arrow in FIG. 9 are displayed on the plurality of electronic apparatuses 100-1 to 100-3. In this case, the processor 120 of each of the plurality of electronic apparatuses 100-1 to 100-3 may control the display 111 to display UIs corresponding to the play adjusting function, the play list selection function, and the volume adjusting function, with reference to the mapping table such as Table 1 stored in the memory 130 of each of the plurality of electronic apparatuses 100-1 to 100-3.

Figure 11:
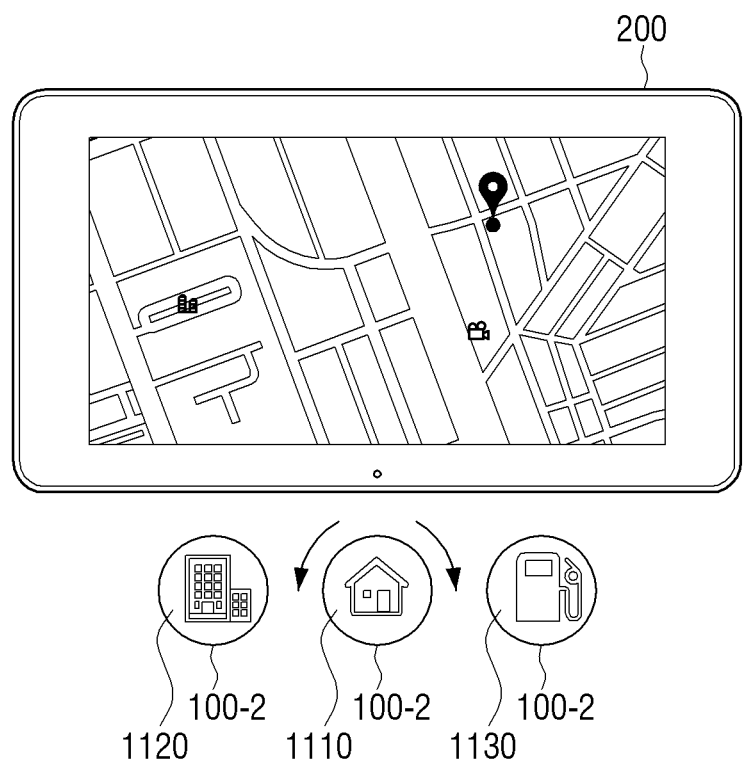
FIG. 11 is a diagram illustrating an example UI for selecting a destination at the time of executing a navigation function according to an embodiment of the disclosure.

FIG. 11 is a diagram illustrating an example UI for selecting a destination at the time of executing a navigation function according to an embodiment of the disclosure. According to an embodiment of the disclosure, if the navigation function is executed in the IVI system 200 while the basic UIs are displayed on the display 111, the processor 120 of the electronic apparatus 2 100-2 may control the display 111 to display a UI for selecting one of a plurality of preset destinations as illustrated in FIG. 11, based on the profile data of the user. In this case, the UI for selecting the destination may include UIs 1110, 1120, and 1130 corresponding to destinations previously registered in the profile data.

The user may manipulate the input device 110 of the electronic apparatus 100-2 to simply set a navigation destination and start directions. For example, as illustrated in FIG. 11, the user may check pre-registered destinations such as a house 1110, a company 1120, and a gas station 1130 by manipulating the input device 110 of the electronic apparatus 100-2 to be rotated, and accordingly, when a destination desired by the user is displayed on the display 111, the user may select the navigation destination by manipulating the input device 110 to be pushed.

As described above, if the destination is selected, the processor 120 may transmit information about the selected destination to the IVI system 200 such that the destination may be set on a navigation app executed on the IVI system.

FIG. 11 illustrates the example in which if the navigation function is executed, the UI for selecting the destination is displayed on the electronic apparatus 2 100-2, but the display of the UI for selecting the destination is not limited thereto, and according to an embodiment, the UI for selecting the destination may be displayed on the electronic apparatus 1 100-1 or the electronic apparatus 3 100-3.

Figure 12:
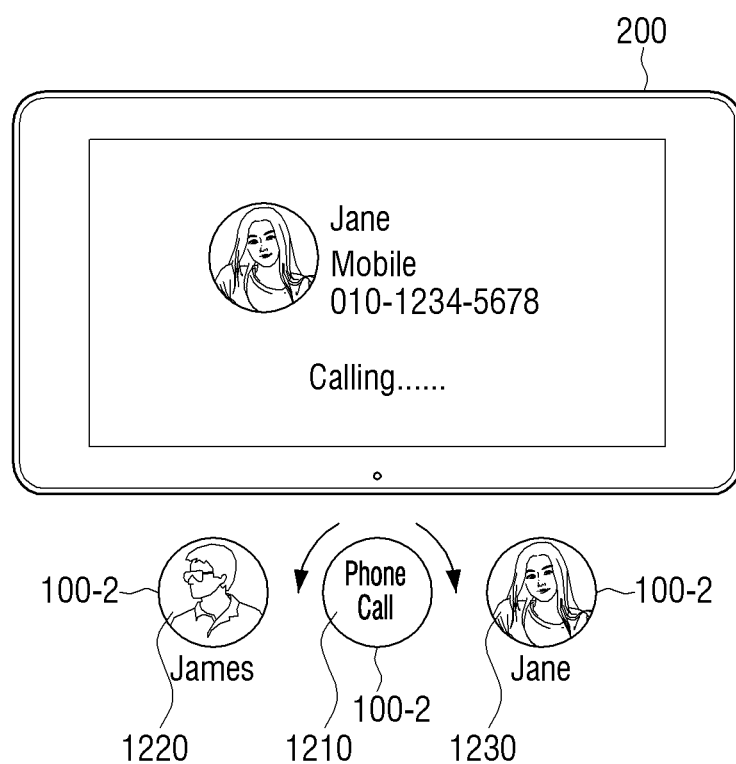
FIG. 12 is a diagram illustrating an example UI for selecting a contact address displayed at the time of executing a call function according to an embodiment of the disclosure.

FIG. 12 is a diagram illustrating an example UI for selecting a contact address displayed at the time of executing a call function according to an embodiment of the disclosure. According to an embodiment of the disclosure, if a call function is executed in the IVI system 200 or other external devices (e.g., a smartphone, a PDA, a tablet, etc. of the user communicatively connected to the IVI system 200 or the electronic apparatus 100-2) having an in-vehicle call function while the basic UIs are displayed on the display 111, the processor 120 of the electronic apparatus 2 100-2 may control the display 111 to display a UI for selecting one of a plurality of preset contact addresses as illustrated in FIG. 12, based on the profile data of the user.

The call function may also be executed through any one of the plurality of electronic apparatuses 100-1 to 100-3 (e.g., the call function is allocated to the electronic apparatus 100-2 as the basic UI and is executed through the user manipulation on the electronic apparatus 100-2), and may also be executed through the IVI system 200 or the user manipulation on other external devices.

The UI for selecting the contact address may include a UI 1210 indicating that the contact address may be selected by manipulating the electronic apparatus 100-2 and UIs 1220 and 1230 indicating pre-registered contact addresses. Therefore, the user may recognize that the contact address may be selected through the current electronic apparatus 100-2 and may select a contact address to make a call by manipulating the electronic apparatus 100-2.

For example, if the input device 110 is manipulated to be rotated while the UI 1210 indicating that the contact address may be selected is displayed, the processor 120 may control the display 111 to change and display the UIs 1220 and 1230 indicating the contact addresses according to the rotation of the input device 110, based on information about the pre-registered contact addresses included in the profile data. For example, as illustrated in FIG. 12, the processor 120 may control the display 111 to display the UI 1220 corresponding to the contact address James when the input device 110 is manipulated to be rotated in the left side, and to display the UI 1230 corresponding to the contact address Jane when the input device 110 is manipulated to be rotated in the right side. In FIG. 12, a case in which the UIs indicating the contact addresses are a picture or a character corresponding to the contact addresses is illustrated as an example, but the UIs indicating the contact addresses may be names of the contact addresses such as "James" and "Jane" or telephone numbers of the contact addresses according to an embodiment.

If the input device 110 is manipulated to be pushed while the UI 1230 corresponding to the contact address Jane is displayed on the display 111, Jane among the plurality of contact addresses is selected as a target to make a call, and the processor 120 controls the communicator 140 to transmit information about the contact address of Jane (e.g., identification information such as a name or telephone number of Jane may be included in the information about the contact address of Jane) to the IVI system 200 in which the call function is executed or other external devices having the call function. Accordingly, the user may call a desired contact address through a simple rotation operation and push operation with respect to the input device 110 of the electronic apparatus 100-2.

If the call is connected with Jane, the processor 120 may control the display 111 to display a UI corresponding to a call volume control function. Thereafter, if the telephone call with Jane is terminated, the processor 120 may control the display 111 to display the basic UI that was displayed before the call function is executed.

FIG. 12 illustrates an example in which if the call function is executed, the UI for selecting the contact address is displayed on the electronic apparatus 2 100-2, but the display of the UI for selecting the contact address is not limited thereto, and according to an embodiment, the UI for selecting the contact address may be displayed on the electronic apparatus 1 100-1 or the electronic apparatus 3 100-3.

Figure 13:
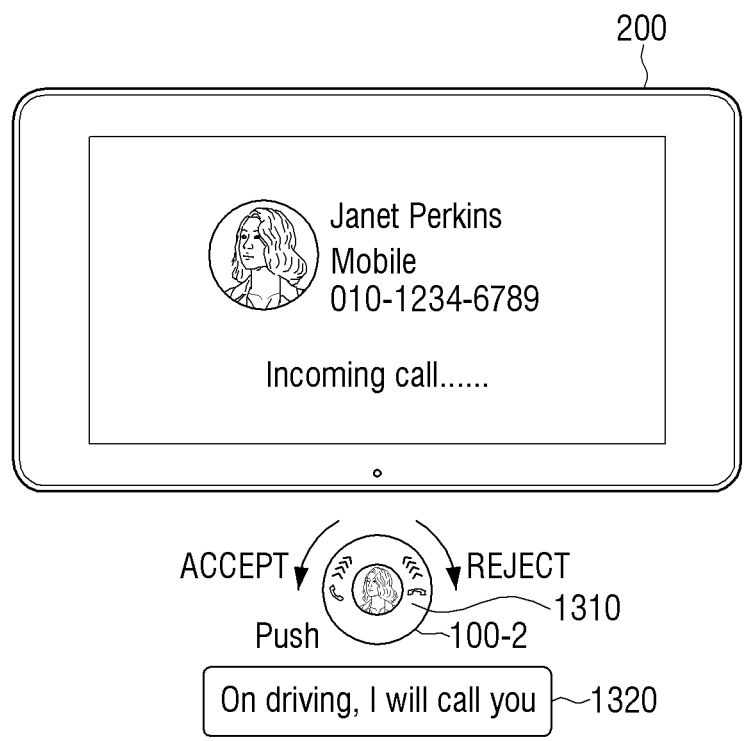
FIG. 13 is a diagram illustrating an example call receiving UI at the time of executing the call function according to an embodiment of the disclosure.

FIG. 13 is a diagram illustrating an example call receiving UI at the time of executing the call function according to an embodiment of the disclosure. According to an embodiment of the disclosure, if the call is received (e.g., if a signal indicating that the call is being received from the IVI system 200 or other external devices having the call function is received through the communicator 140) while the basic UIs are displayed on the display 111, the processor 120 of the electronic apparatus 2 100-2 may control the display 111 to display a UI 1310 indicating that the call is being received as illustrated in FIG. 13.

In addition, if the call is received, the processor 120 may control the communicator 140 to transmit a signal for accepting or rejecting the call to the IVI system 200 or other external devices having the call function according to the rotation manipulation of the input device 110.

For example, as illustrated in FIG. 13, if the input device 110 is manipulated to be rotated to the left side while the call is being received from Janet, the processor 120 may control the communicator 140 to transmit the signal for accepting the call to the IVI system 200 or other external devices. In addition, if the input device 110 is manipulated to be rotated to the right side while the call is from Janet, the processor 130 may control the communicator 140 to transmit the signal for rejecting the call to the IVI system 200 or other external devices.

According to an embodiment, if the call reception is rejected or the input device 110 is manipulated to be pushed while the UI 1310 indicating that the call is being received is displayed, the processor 120 may control the display 111 to display a UI (not illustrated) for selecting any one 1320 of the simple reply messages pre-stored in the memory 130.

Accordingly, if a message such as "On driving, I will call you" (1320) is selected, the processor 120 may control the communicator 140 to transmit the selected message to the IVI system 200 or other external devices. The IVI system 200 or other external devices receiving the simple message from the electronic apparatus 100-2 may transmit the received message to the telephone number of Janet.

In addition, if the received call is rejected or a rejection message is transmitted to the received telephone number, the processor 120 may control the display 111 to display the basic UI that was displayed before the call is received.

If the call is connected with Janet, the processor 120 may control the display 111 to display a UI corresponding to a call volume control function. Thereafter, if the telephone call with Janet is terminated, the processor 120 may control the display 111 to display the basic UI that was displayed before the call is received.

FIG. 13 illustrates the example in which if the call is received, the UI indicating that the call is being received is displayed on the electronic apparatus 2 100-2, but the display of the UI indicating that the call is being received is not limited thereto, and according to an embodiment, the UI indicating that the call is being received may be displayed on the electronic apparatus 1 100-1 or the electronic apparatus 3 100-3.

Figure 14:
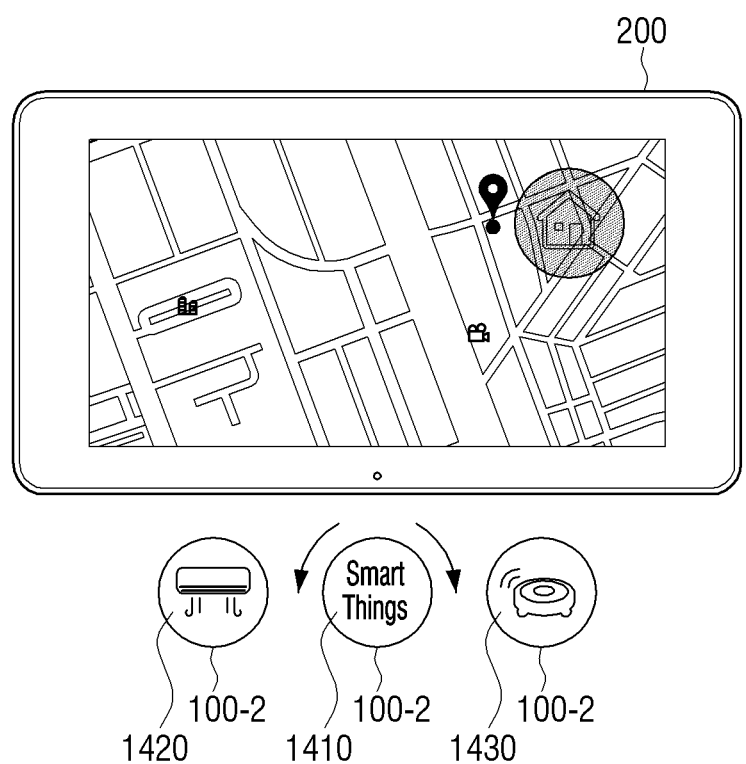
FIG. 14 is a diagram illustrating an example UI for selecting an IoT device according to an embodiment of the disclosure.

FIG. 14 is a diagram illustrating an example UI for selecting an IoT device according to an embodiment of the disclosure. According to an embodiment of the disclosure, if the vehicle is located within a preset distance from a destination that is set by the navigation function executed in the IVI system 200 while the basic UIs are displayed on the display 111, the processor 120 of the electronic apparatus 2 100-2 may control the display 111 to display a UI 1410 for selecting an IoT device based on the profile data of the user.

The IVI system 200 may include configurations for providing location based services, such as a global positioning system (GPS) module, with respect to the navigation function. Therefore, the IVI system 200 may determine whether the vehicle is located within a preset distance from the navigation destination, and if it is determined that the vehicle is located within the preset distance, the IVI system 200 may transmit a signal indicating that the vehicle has entered within the preset distance from the navigation destination to the electronic apparatus 100-2.

As described above, if the signal indicating that the vehicle has entered within the preset distance from the navigation destination is received through the communicator 140, the processor 120 may control the display 111 to display the UI 1410 for selecting the IoT device.

As illustrated in FIG. 14, the UI for selecting the IoT device may include a UI 1410 indicating that an IoT device for remote control may be selected by manipulating the electronic apparatus 100-2 and UIs 1420 and 1430 indicating pre-registered IoT devices. In this case, the IoT devices displayed by the UIs 1420 and 1430 may be IoT devices existing at corresponding destinations and pre-registered in the profile data as remote control targets by the user. For example, if the navigation destination is set to a "home", IoT devices that are pre-registered in the profile data by the user as remote control target devices among the IoT devices existing in the "home" are displayed as the UIs 1420 and 1430.

Accordingly, the user may recognize that the IoT device may be currently selected through the electronic apparatus 100-2 and may select an IoT device to be remotely controlled by manipulating the electronic apparatus 100-2.

For example, if the input device 110 is manipulated to be rotated while the UI 1410 for selecting the IoT device is displayed, the processor 120 may control the display 111 to change and display the UIs 1420 and 1430 indicating the IoT devices according to the rotation of the input device 110, based on information about the pre-registered IoT devices included in the profile data. For example, as illustrated in FIG. 14, the processor 120 may control the display 111 to display the UI 1420 corresponding to an air conditioner when the input device 110 is manipulated to be rotated in the left side, and to display the UI 1430 corresponding to a robot cleaner when the input device 110 is manipulated to be rotated in the right side. In FIG. 14, a case in which the UIs indicating the IoT devices are a picture or a character corresponding to the IoT devices is illustrated as an example, but according to an embodiment, the UIs indicating the IoT devices may also be texts such as an "air conditioner" and a "robot cleaner".

If the input device 110 is manipulated to be pushed while the UI 1420 indicating the air conditioner 1420 is displayed on the display 111, the air conditioner 1420 is selected as a remote control target, and the processor 120 may control the display 111 to display a UI (not illustrated) for controlling the air conditioner 1420. According to an embodiment, the UI for controlling the air conditioner 1420 may also be displayed on the IVI system 200.

A control command that is input through the electronic apparatus 100-2 (or a control command that is directly input through the IVI system 200) may be transmitted to a target IoT device through the IVI system 200. Accordingly, the user may remotely control the IoT device existing at the navigation destination.

If the control for the selected IoT device is completed or a predetermined time elapses after the control command is input, the processor 120 may control the display 111 to display the basic UI that was previously displayed.

FIG. 14 illustrates an example in which if the vehicle is located within the preset distance from the navigation destination, the UI for selecting the IoT device is displayed on the electronic apparatus 2 100-2, but the display of the UI for selecting the IoT device is not limited thereto, and according to an embodiment, the UI for selecting the IoT device may also be displayed on the electronic apparatus 1 100-1 or the electronic apparatus 3 100-3.

Figure 15:
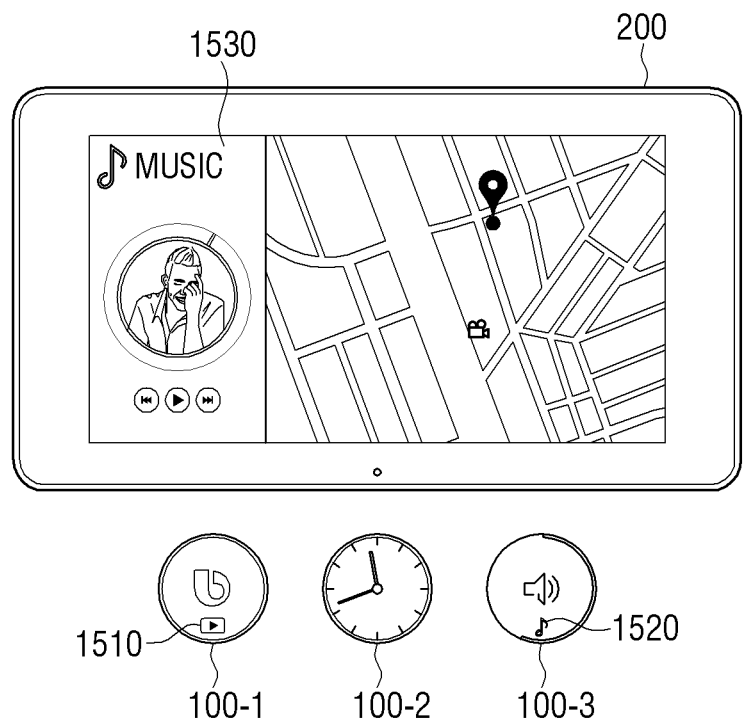
FIG. 15 is a diagram illustrating example UIs corresponding to functions frequently used during driving according to an embodiment of the disclosure.

FIG. 15 is a diagram illustrating example UIs corresponding to functions frequently used during driving according to an embodiment of the disclosure. According to an embodiment of the disclosure, the processor 120 of each of the plurality of electronic apparatuses 100-1 to 100-3 may control the display 111 to display UIs corresponding to functions frequently used by the user during driving on at least one region of the display 111 on which the basic UIs are displayed, based on the profile data of the user.

For example, in a case in which a voice agent function, a clock function, and a volume adjusting function are set, respectively, as functions corresponding to the basic UIs to be displayed on the electronic apparatuses 100-1 to 100-3, and a moving image play function and a music play function are set, respectively, as function frequently used during driving to be displayed on the electronic apparatuses 100-1 to 100-3, it may be seen as illustrated in FIG. 15 that the basic UIs corresponding to the voice agent function, the clock function, and the volume adjusting function are displayed on the electronic apparatuses 100-1 to 100-3, respectively, a UI 1510 corresponding to the moving image play function is displayed on one region of a screen of the electronic apparatus 1 100-1, and a UI 1520 corresponding to the music play function is displayed on one region of a screen of the electronic apparatus 3 100-3.

The user may use the two functions of the vehicle displayed on the electronic apparatus 1 100-1, for example, the voice agent function and the moving image play function, through different manipulations on the input device, respectively. For example, the user may use the voice agent function which is a basic function by pushing the input device 110 of the electronic apparatus 1 100-1 once, and may use the moving image play function by pushing the input device 110 of the electronic apparatus 1 100-1 twice (or double pushing).

The same applies to the electronic apparatus 3 100-3. For example, the user may adjust an air volume by manipulating the input device 110 of the electronic apparatus 3 100-3 to be rotated, and may execute the music play function by pushing the input device 110 of the electronic apparatus 3 100-3 twice. FIG. 15 illustrates the case in which the user double-pushes the input device 110 of the electronic apparatus 3 100-3 and the music play function 1530 is executed in the IVI system 200.

The types of the functions of the vehicle frequently used by the user during driving or whether the functions are allocated to which electronic apparatus of the plurality of electronic apparatuses 100-1 to 100-3 may be changed according to the setting of the user, and the embodiment is not limited to the example disclosed in FIG. 15. In addition, the user manipulation for controlling the functions frequently used during driving is also not limited to the twice push manipulations of the input device 110, and may be differently set by the developer.

FIGS. 16A, 16B, 16C and 16D are diagrams illustrating various embodiments of the disclosure using the plurality of electronic apparatuses.

Figure 16A:
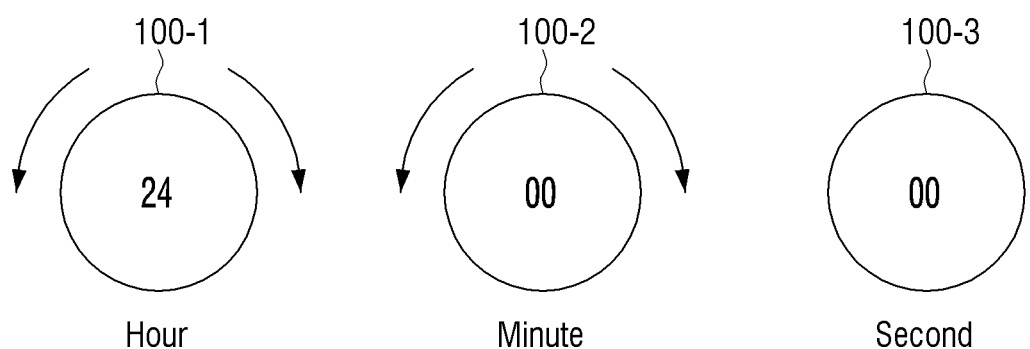
FIG. 16A is a diagram illustrating an example of setting a time using a plurality of electronic apparatuses according to an embodiment of the disclosure.

According to an embodiment of the disclosure, the plurality of electronic apparatuses 100-1 to 100-3 may be used for time setting as illustrated in FIG. 16A. For example, if the user manipulates the input device 110 of the electronic apparatus 2 100-2 to be pushed for a preset time or more while a UI corresponding to the clock function as the basic UI is displayed on the display 111 of the electronic apparatus 2 100-2 (an example of entering a time setting mode is not limited thereto), a UI for setting a time may be displayed on the electronic apparatus 1 100-1, a UI for setting a minute may be displayed on the electronic apparatus 2 100-2, and a UI for setting seconds may be displayed on the electronic apparatus 3 100-3, respectively, as illustrated in FIG. 16A. Accordingly, the user may set the time by performing rotation and push manipulations on the input device 110 of each of the electronic apparatuses 110-1 to 110-3.

Figure 16B:
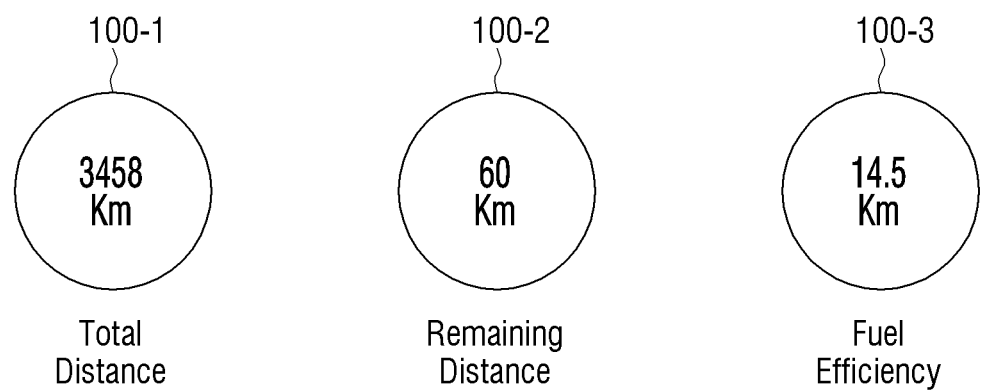
FIG. 16B is a diagram illustrating an example of displaying a mileage using a plurality of electronic apparatuses according to an embodiment of the disclosure.

According to an embodiment of the disclosure, the plurality of electronic apparatuses 100-1 to 100-3 may be used to display and reset a driving distance as illustrated in FIG. 16B. For example, if the vehicle control system 300 detects that the remaining fuel amount is less than a preset amount (an example of entering a driving distance display and reset mode is not limited thereto), a UI indicating a total driving distance may be displayed on the electronic apparatus 1 100-1, a UI indicating a distance that can be driven with the remaining fuel may be displayed on the electronic apparatus 2 100-2, and a UI indicating fuel efficiency may be displayed on the electronic apparatus 3 100-3, respectively, as illustrated in FIG. 16B. Accordingly, the user may check information related to the fuel, and in some cases, may manipulate the input device 110 of the electronic apparatus 1 100-1 to reset the total driving distance.

Figure 16C:
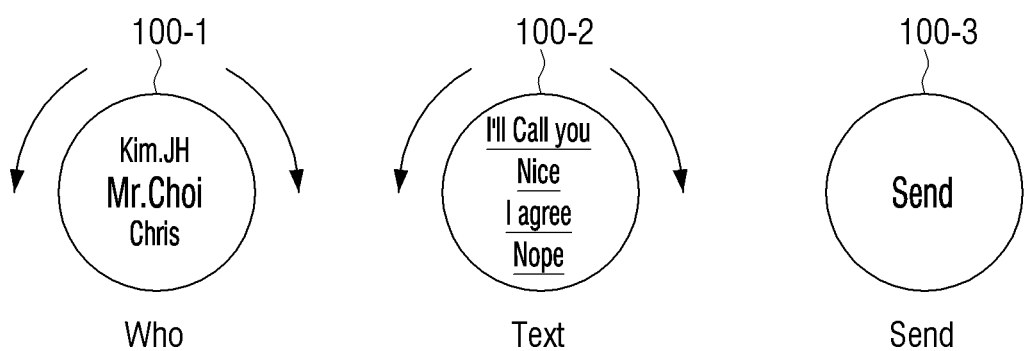
FIG. 16C is a diagram illustrating an example of writing a message using a plurality of electronic apparatuses according to an embodiment of the disclosure.

In addition, according to an embodiment of the disclosure, the plurality of electronic apparatuses 100-1 to 100-3 may be used to write a simple message as illustrated in FIG. 16C. For example, as described in FIG. 13, in the case in which the call is received through the IVI system 200 having the call function or other external devices having the call function, if the input device 110 of the electronic apparatus 100 on which the UI 1310 indicating that the user rejects the call reception or the call is being received is displayed is manipulated to be pushed, UIs for writing a simple message may be displayed on the plurality of electronic apparatuses 100-1 to 100-3.

For example, as illustrated in FIG. 16C, a UI for selecting a message send target may be displayed on the electronic apparatus 1 100-1, a UI for selecting a simple message content may be displayed on the electronic apparatus 2 100-2, and a UI for generating a message send command may be displayed on the electronic apparatus 3 100-3.

If the user selects the message send target by manipulating the input device 110 of the electronic apparatus 1 100-1 to be rotated, selects the message content by manipulating the input device 110 of the electronic apparatus 2 100-1 to be rotated, and then manipulates the electronic apparatus 3 100-3 to be pushed, the processor 120 may control the communicator 140 to generate a command for sending a message of the selected content to the selected target, and send the command to the IVI system 200 or the external electronic device having the call function. Accordingly, the selected message may be sent to the target selected by the user.

The example in which the UI for writing the simple message is displayed is not limited thereto. For example, even if the call is not received, but the user wants to send the simple message to the acquaintance, the user may use the function of writing the simple message through the plurality of electronic apparatuses 100-1 to 100-3 by manipulating the electronic apparatus 100 or the IVI system 200 in a predefined method.

Figure 16D:
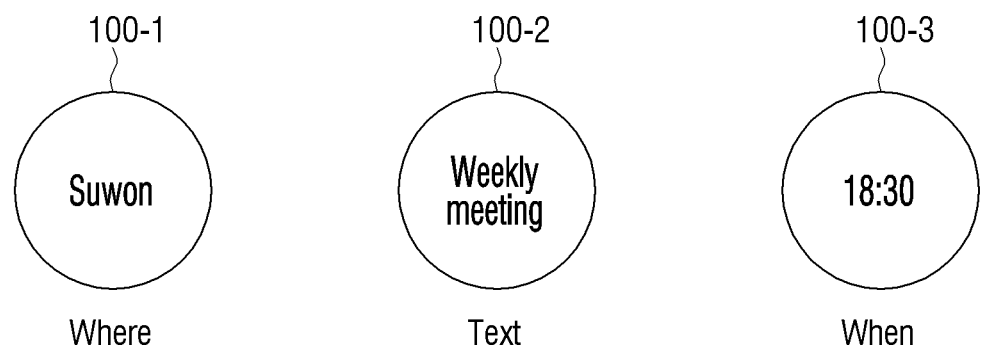
FIG. 16D is a diagram illustrating an example of setting an alarm using a plurality of electronic apparatuses according to an embodiment of the disclosure.

In addition, according to an embodiment of the disclosure, the plurality of electronic apparatuses 100-1 to 100-3 may be used to set alarms or notifications as illustrated in FIG. 16D. As illustrated in FIG. 16D, a UI for selecting a place may be displayed on the electronic apparatus 1 100-1, a UI for selecting content may be displayed on the electronic apparatus 2 100-2, and a UI for selecting a time may be displayed on the electronic apparatus 3 100-3.

Accordingly, the user may select the place by manipulating the electronic apparatus 1 100-1 to be rotated, select the content by manipulating the electronic apparatus 2 100-2 to be rotated, and select the time by manipulating the electronic apparatus 3 100-3 to be rotated.

As described above, the selected place, content, and time may be set as the alarms, and if the time approaches the set time, the place, content, and time corresponding to the set alarms may be displayed on the plurality of electronic apparatuses 100-1 to 100-3. According to an embodiment, if the electronic apparatus 1 100-1 on which the place is displayed is manipulated to be pushed, the corresponding place may also be set to a destination of the navigation function.

Figure 17:
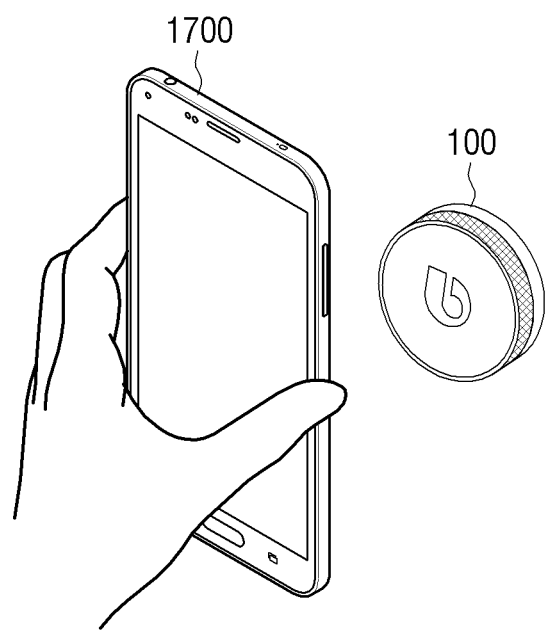
FIG. 17 is a diagram illustrating an example in which an electronic apparatus and an external mobile device interlock according to an embodiment of the disclosure.

FIG. 17 is a diagram illustrating an example embodiment in which the electronic apparatus and an external mobile device interlock according to an embodiment of the disclosure. For example, the electronic apparatus 100 and an external mobile device 1700 may be communicatively connected to each other through a short range communication method such as, for example, and without limitation, NFC or Bluetooth. Accordingly, the processor 120 may acquire and use a variety of information including the profile data of the user from the external mobile device 1700.

FIG. 17 illustrates an example in which the external mobile device 1700 and any one electronic apparatus 100 among the plurality of electronic apparatuses 100-1 to 100-3 communicate in an NFC manner.

For example, if the external mobile device 1700 is tagged to the electronic apparatus 100, the processor 120 may receive the profile data of the user from the external mobile device 1700 through the communicator 140.

As described above, the received profile data of the user may be added to the profile data for each user stored in the memory 130, or may be used by the processor 120 in preference to profile data for each user stored in the memory 130 according to an embodiment.

For example, in the embodiment in which the received profile data of the user is added to the profile data for each user, the profile data acquired from the external mobile device 1700 may be selected through the UI for user selection described above and used by the processor 120. In the embodiment in which the profile data acquired from the external mobile device 1700 is preferentially used, even if the electronic apparatus 100 is currently operating based on profile data of a user A, when profile data of a user B is received from the external mobile device 1700, the electronic device 100 operates based on the profile data of the user B after the reception of the profile data of the user B.

According to an embodiment, if alarm information is received from the external mobile device 1700, an alarm may be displayed on the plurality of electronic apparatuses 100-1 to 100-3 according to time information included in the received alarm as illustrated in FIG. 16D.

In addition, according to an embodiment, if information about content being played on the external mobile device 1700 is received through the communicator 140, the processor 120 may transmit the received information to the IVI system 200. Accordingly, the IVI system 200 may subsequently play the content being played on the external mobile device 1700 based on the information received from the electronic apparatus 100.

Figure 18:
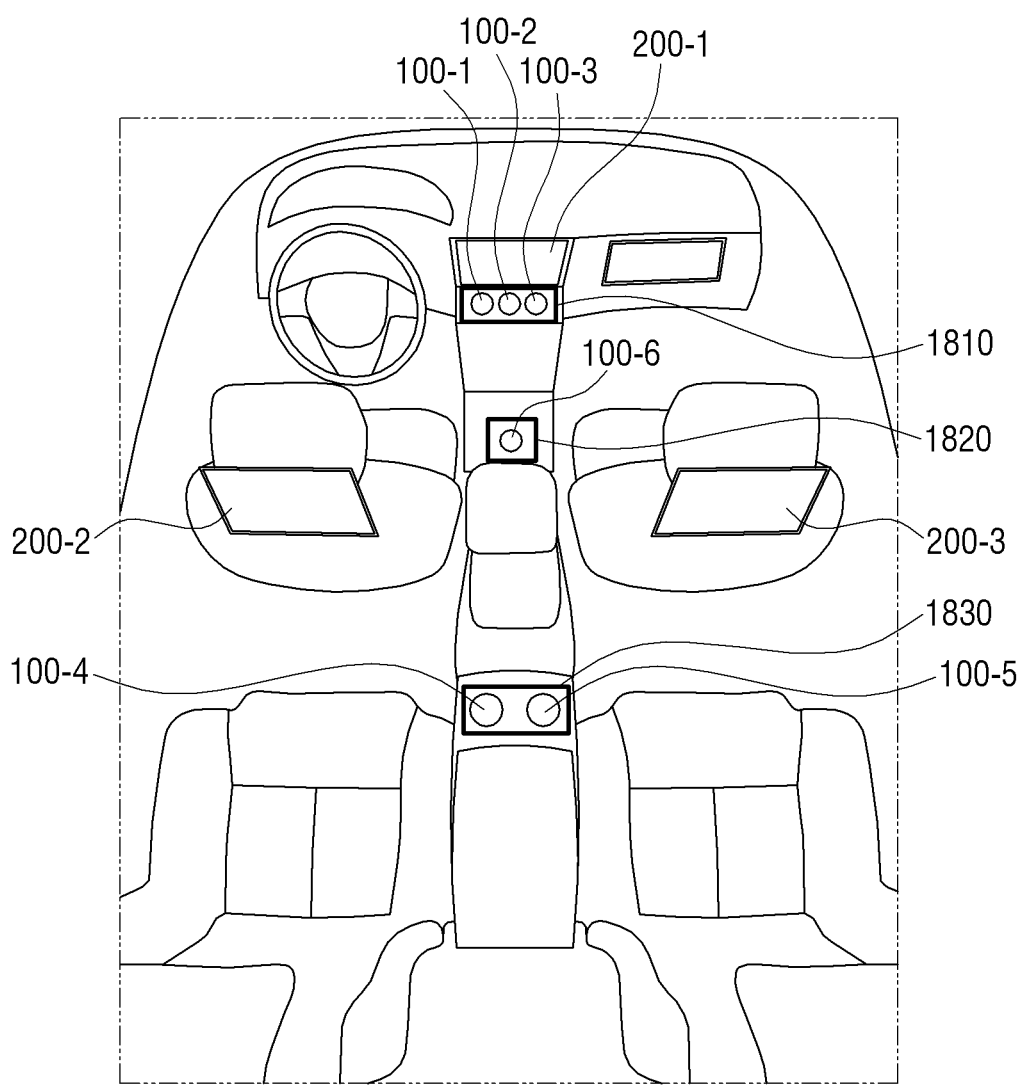
FIG. 18 is a diagram illustrating an example in which a plurality of electronic apparatuses are disposed in a vehicle according to an embodiment of the disclosure.

FIG. 18 is a diagram illustrating an example in which a plurality of electronic apparatuses are disposed in a vehicle according to an embodiment of the disclosure. As illustrated in FIG. 18, electronic apparatuses 100-1, 100-2, 100-3, 100-4, 100-5, 100-6 (which may be referred to hereinafter as 100-1 to 100-6) may be disposed not only in a front seat region 1810 but also in a rear seat region 1830, and may also be disposed in a gear box region 1820.

In the case of the plurality of electronic apparatuses 100-1 to 100-3 disposed in the front seat region 1810, the operation thereof is as described above. The electronic apparatuses 100-4 and 100-5 disposed in the rear seat region 1830 may also operate similarly to the electronic apparatuses 100-1 to 100-3 disposed in the front seat region 1810.

However, the electronic apparatuses 100-4 and 100-5 disposed in the rear seat region 1830 may be preferably configured to perform a function specific to multimedia playback rather than the function control of the vehicle described above. For example, when a user X watches content C through the mobile device and boards the rear seat and tags the mobile device to the electronic apparatus 100-4, the electronic apparatus 100-4 may acquire information about the content C from the mobile device of the user X and transmit the information to the IVI system 200. Accordingly, the IVI system 200 may subsequently display the content C through a display 200-2 or 200-3 disposed at the rear seat, thereby providing a seamless content viewing experience to the user X.

The electronic apparatus 100-6 disposed in the gear box region 1820 may be configured to adjust a gear of the vehicle according to the rotation manipulation of the input device 110.

Figure 19:
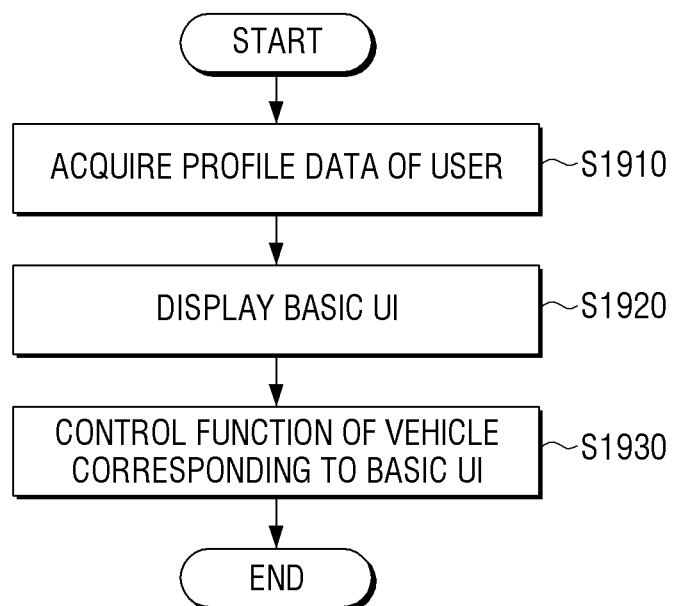
FIG. 19 is a flowchart illustrating an example method of controlling an electronic apparatus according to an embodiment of the disclosure.

FIG. 19 is a flowchart illustrating an example method of controlling an electronic apparatus 100 according to an embodiment of the disclosure. The electronic apparatus 100 may include an input device including a body part configured to be rotatable and pushable and a display disposed on the body part.

Referring to FIG. 19, the electronic apparatus 100 may acquire profile data of a user including preset information for the functions of the vehicle (S1910). The profile data of the user may also be acquired from the memory 130 provided in the electronic apparatus 100, and may also be acquired from an external mobile device. In addition, the functions of the vehicle may include at least one of the functions provided by the vehicle control system 300 or the functions provided by the IVI system disposed in the vehicle.

Accordingly, the electronic apparatus 100 may display basic UIs corresponding to the functions of the vehicle based on the acquired profile data of the user (S1920), and controls the functions of the vehicle corresponding to the basic UIs (S1930) according to an input user manipulation when a user manipulation is input.

Figure 20:
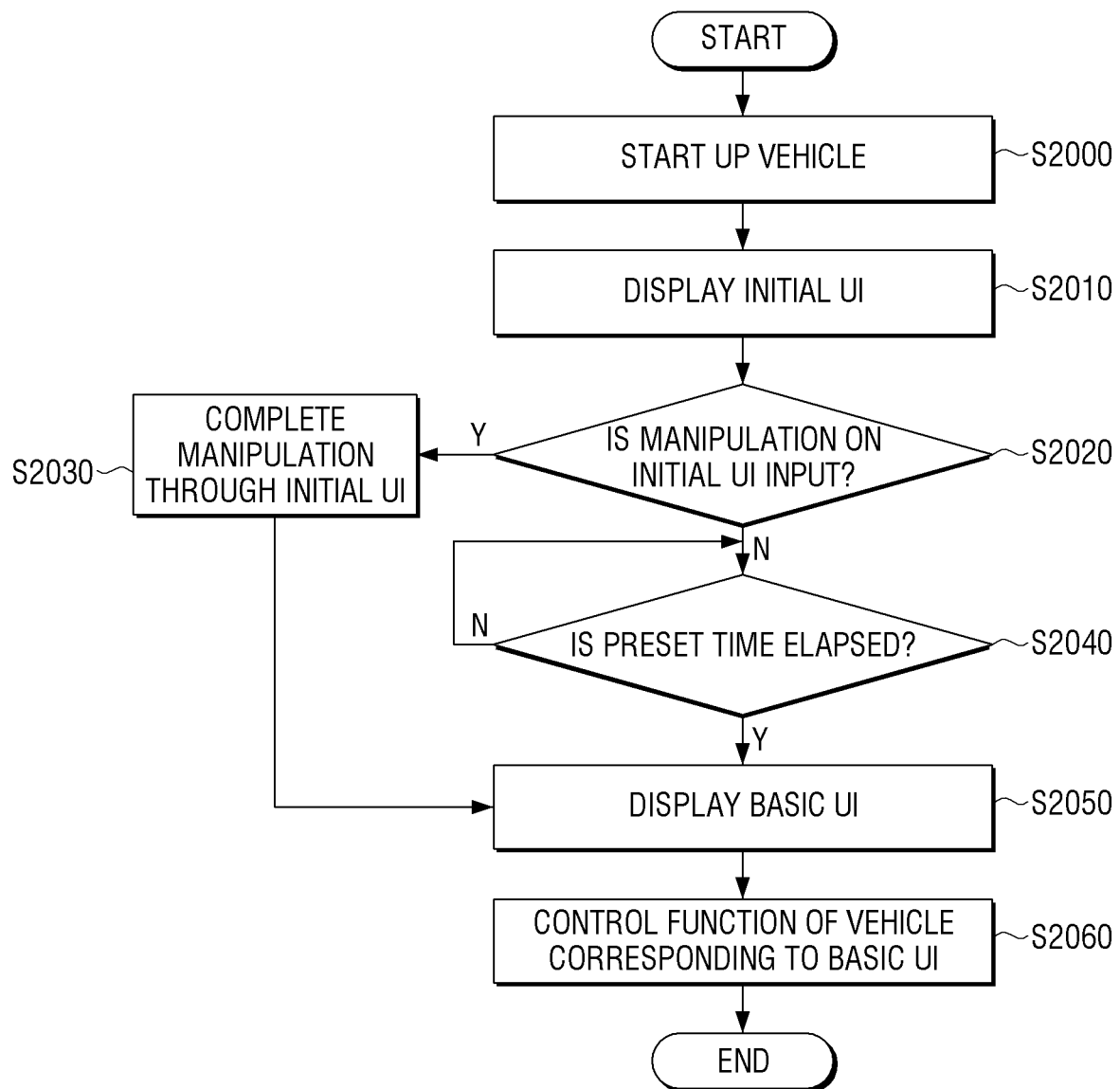
FIG. 20 is a flowchart illustrating an example method of controlling an electronic apparatus according to another embodiment of the disclosure.

FIG. 20 is a flowchart illustrating an example method of controlling an electronic apparatus according to another embodiment of the disclosure. FIG. 20 illustrates an initial UI related operation. In the description of FIG. 20, a description overlapping with the above description may not be repeated.

Referring to FIG. 20, if the vehicle is started up (S2000), the electronic apparatus 100 may display initial UIs based on profile data of a user (S2010). The initial UIs may include a UI for user selection and a UI corresponding to a function frequently used by the user at the time of starting up the vehicle.

If a user manipulation on the initial UI is input (Y in S2020), the electronic apparatus 100 may perform an operation according to the user manipulation, and if the manipulation through the initial UI is completed (S2030), the electronic apparatus 100 may display a basic UI based on the profile data of the user (S2050).

If a preset time elapses (Y in S2040) without any manipulation of the user (N in S2020) after the initial UI is displayed, the electronic apparatus 100 may display the basic UI based on the profile data of the user (S2050).

Accordingly, the user may control a function of the vehicle corresponding to the basic UI by manipulating the electronic apparatus 100 (S2060).

Figure 21:
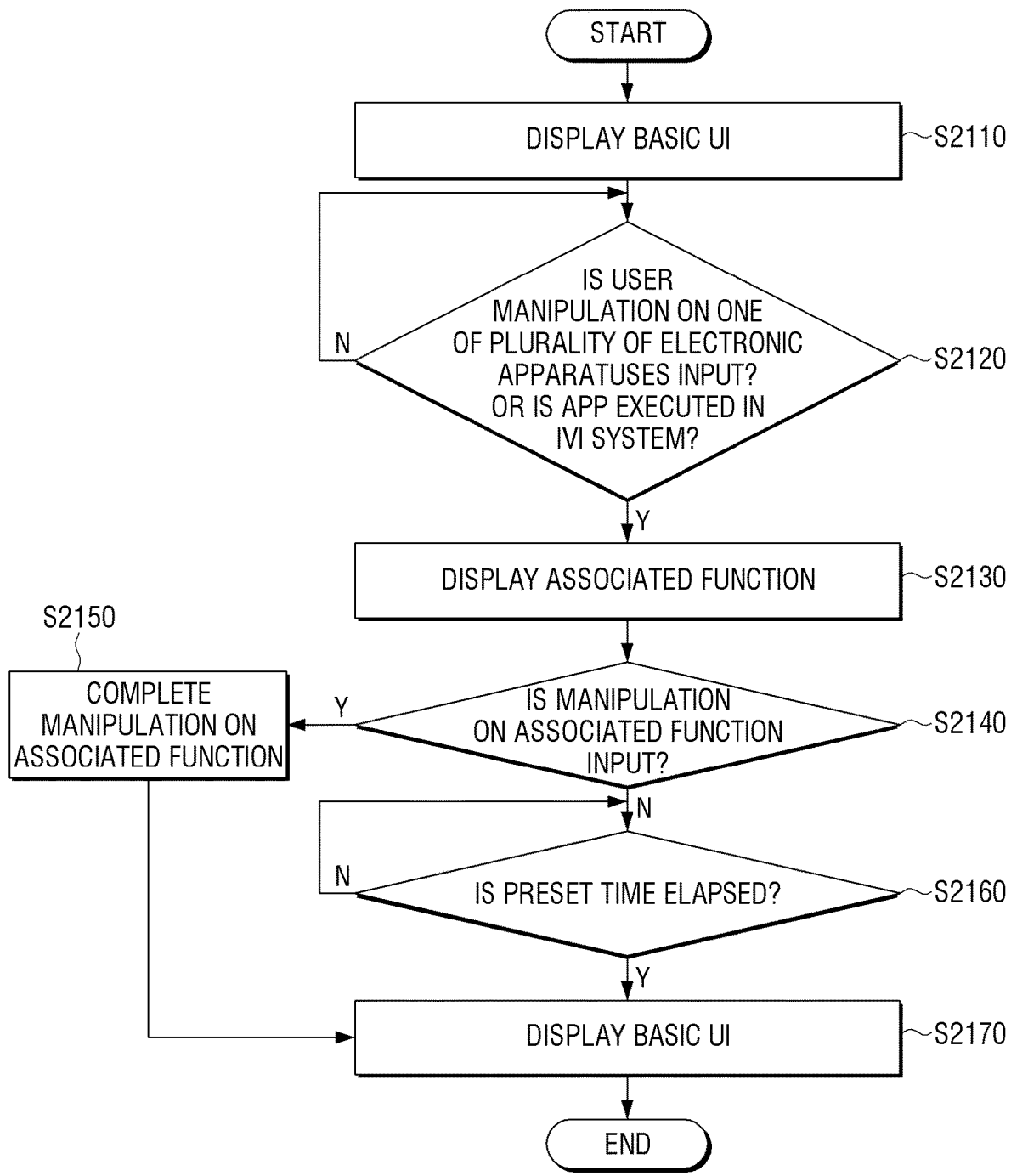
FIG. 21 is a flowchart illustrating an example method of controlling an electronic apparatus according to still another embodiment of the disclosure.

FIG. 21 is a flowchart illustrating an example method of controlling an electronic apparatus according to still another embodiment of the disclosure. FIG. 21 illustrates an operation of the electronic apparatus 100 according to a context of a user. The context of the user may include a case in which a user manipulation on another electronic apparatus among the plurality of electronic apparatuses 100-1 to 100-3 is input while the basic UI is displayed, or the function of the vehicle is executed in the IVI system 200 while the basic UI is displayed. In the description of FIG. 21, a description overlapping with the above description will be omitted.

Referring to FIG. 21, if a user manipulation on one of the plurality of electronic apparatuses is input or a specific app is executed in the IVI system 200 (Y in S2120) while the electronic apparatus 100 displays the basic UI (S2110), the electronic apparatus 100 displays a UI corresponding to a function of the vehicle associated with a manipulation that is input to another electronic apparatus or a function of the vehicle associated with an app executed in the IVI system 200 (S2130).

Accordingly, if a manipulation on the associated function is input (Y in S2140) and the manipulation on the associated function is completed (S2150), the electronic apparatus 100 may display the basic UI that was previously displayed again.

In addition, if a user manipulation on the associated function being displayed is not input (N in S2140) and a preset time elapses (Y in S2160), the electronic apparatus 100 may display the basic UI that was previously displayed again (S2170).

As described above, according to the various example embodiments of the disclosure, the user of the vehicle may more safely and conveniently use the functions or the services provided in the vehicle. In addition, the personalized service may be provided according to the user of the vehicle, and the function control suitable for the context of the user of the vehicle may be provided. Accordingly, the user of the vehicle may quickly manipulate various functions provided in the vehicle while minimizing and/or reducing gaze deviation.

The various example embodiments of the disclosure may be implemented by software including instructions that are stored in machine-readable storage media (e.g., a computer). The machine is an apparatus that invokes the stored instructions from the storage medium and is operable according to the invoked instructions, and may include the electronic apparatus 100 (100-1 to 100-6) according to the disclosed embodiments. When the instructions are executed by the processor, the processor may perform functions corresponding to the instructions, either directly or using other components under the control of the processor. The instructions may include codes generated by a compiler or a code executed by an interpreter. The machine-readable storage media may be provided in the form of non-transitory storage media. The 'non-transitory' storage medium may not include a signal and is tangible, but does not distinguish whether data is stored semi-permanently or temporarily in the storage medium.

According to an embodiment, the method according to the various example embodiments disclosed in the disclosure may be included and provided in a computer program product. The computer program product may be traded as a product between a seller and a purchaser. The computer program product may be distributed in the form of a machine readable storage media (e.g., a compact disc read only memory (CD-ROM)), or online through an application store (e.g., PlayStore™). In case of the online distribution, at least a portion of the computer program product may be at least temporarily stored in a storage medium such as a server of a manufacturer, a server of an application store, or a memory of a relay server, or be temporarily generated.

Each of the components (e.g., modules or programs) according to the various example embodiments may include a single entity or a plurality of entities, and some sub-components of the sub-components described above may be omitted, or other sub-components may be further included in the diverse embodiments. Alternatively or additionally, some components (e.g., modules or programs) may be integrated into one entity to perform the same or similar functions performed by the respective components prior to the integration. The operations performed by the module, the program, or other component, in accordance with the diverse embodiments may be executed in a sequential, parallel, iterative, or heuristic manner, or at least some operations may be executed in a different order or omitted, or other operations may be added.

The above description is merely illustrative of the spirit of the disclosure, and those skilled in the art to which the disclosure pertains may make various modifications and changes without departing from the spirit and scope of the disclosure. In addition, the embodiments according to the disclosure are not intended to limit the disclosure but are described, and the scope of the disclosure is not limited by these embodiments. Therefore, the protection scope of the disclosure should be interpreted by the following claims, and all technical ideas within the equivalent scope shall be interpreted as being included in the scope of the disclosure.

What is claimed is:

1. A system comprising two or more electronic apparatuses disposed in a vehicle, each electronic apparatus comprising:
   a communicator comprising circuitry;
   an input device comprising a body configured to be rotatable and pushable and a display disposed on the body; and
   a processor configured to:
      acquire profile data of a user including preset information for a function of the vehicle,
      control the display to display a basic user interface (UI) corresponding to the function of the vehicle based on the acquired profile data of the user, and
      control the function of the vehicle corresponding to the basic UI in response receiving an input to the input device,
   wherein the processor of a first electronic apparatus of the two or more electronic apparatuses is configured to change the basic UI of the first electronic apparatus to a UI related to a user manipulation of the input device of a second electronic apparatus of the two or more electronic apparatuses,
   wherein the processor of the first electronic apparatus is further configured to:
      in response to starting of the vehicle, control the display of the first electronic apparatus to display a UI corresponding to a function frequently used by the user at a time of starting the vehicle based on the profile data of the user, the function frequently used by the user at the time of starting the vehicle including at least one function previously set as frequently used by the user at the time of starting the vehicle from among a plurality of functions provided by the IVI system disposed in the vehicle,
      in response to the input device of the first electronic apparatus being pushed while the UI corresponding to the function frequently used by the user at the time of starting the vehicle is displayed on the display of the first electronic apparatus, control the communicator of the first electronic apparatus to transmit a command for executing the function frequently used by the user at the time of starting the vehicle to the IVI system, and in response to the function frequently used by the user at the time of starting the vehicle being terminated, control the display of the first electronic apparatus to display the basic UI based on the profile data of the user.

2. The system as claimed in claim 1, wherein the function of the vehicle includes at least one of a function provided by the vehicle or a function provided by an in-vehicle infotainment (IVI) system disposed in the vehicle.

3. The system as claimed in claim 1, further comprising a memory configured to store profile data for each user of a plurality of different users including information on a function of the vehicle preset for each user,
   wherein the processor of the first electronic apparatus is configured to:
      control the display of the first electronic apparatus to display a UI for user selection in response to starting of the vehicle,
      control the display of the first electronic apparatus to display a basic UI corresponding to the function of the vehicle set for a previously selected user based on the profile data of the previously selected user, in response to a preset time elapsing without receiving an input to the input device of the first electronic apparatus while the UI for user selection is displayed on the display of the first electronic apparatus, and
      control the display of the first electronic apparatus to display a basic UI corresponding to the function of the vehicle set for a newly selected user based on the profile data of the newly selected user based on the newly selected user being newly selected through the input device of the first electronic apparatus while the UI for user selection is displayed on the display of the first electronic apparatus.

4. The system as claimed in claim 1, wherein the processor of the first electronic apparatus is configured to:
   control the display of the first electronic apparatus to display the basic UI corresponding to the function of the vehicle set for the user based on the profile data of the user in response to a preset time elapsing without receiving an input to the input device of the first electronic apparatus while the UI corresponding to the function frequently used by the user at the time of starting the vehicle is displayed on the display of the first electronic apparatus.

5. The system as claimed in claim 1, wherein the processor of first electronic apparatus is configured to control the display of the first electronic apparatus to change the UI related to the user manipulation back to the basic UI in response to a preset time elapsing without receiving an input to the input device of the first electronic apparatus and the input device of the second electronic apparatus while the UI related to the user manipulation is displayed on the display of the first electronic apparatus.

6. The system as claimed in claim 1, wherein the processor of the first electronic apparatus is configured to control the display of the first electronic apparatus to change the basic UI to a UI corresponding to a function associated with an executed function in response to a function of a plurality of functions provided by an IVI system disposed in the vehicle being executed while the basic UI is displayed on the display of the first electronic apparatus.

7. The system as claimed in claim 6, wherein the processor of the first electronic apparatus is configured to control the display of the first electronic apparatus to change the UI corresponding to the function associated with an executed function back to the basic UI in response to the function executed in the IVI system being terminated.

8. The system as claimed in claim 1,
wherein the processor of the first electronic apparatus is configured to:
control the display of the first electronic apparatus to display a UI for selecting one of a plurality of preset destinations based on the profile data of the user in response to a navigation function provided by an IVI system disposed in the vehicle being executed, and
control the communicator of the first electronic apparatus to transmit information about a selected destination to the IVI system in response to the destination being selected on the UI for selecting the destination through manipulation of the input device of the first electronic apparatus.

9. The electronic apparatus as claimed in claim 1,
wherein the processor of the first electronic apparatus is configured to:
control the display of the first electronic apparatus to display a UI for selecting one of a plurality of preset contact addresses based on the profile data of the user in response to a call function provided by an IVI system disposed in the vehicle being executed, and
control the communicator of the first electronic apparatus to transmit information about a selected contact address to the IVI system in response to the contact address being selected on the UI for selecting the contact address through manipulation of the input device of the first electronic apparatus.

10. The electronic apparatus as claimed in claim 1, wherein the processor of the first electronic apparatus is configured to:
control the display of the first electronic apparatus to display a UI for selecting an Internet of Things (IoT) device based on the profile data of the user in response to the vehicle being located within in a preset distance from a destination set by a navigation function executed in an IVI system disposed in the vehicle, and
control the display of the first electronic apparatus to display a UI for controlling a selected IoT device in response to the IoT device being selected on the UI for selecting the IoT device through manipulation of the input device of the first electronic apparatus.

11. The system as claimed in claim 1, wherein the processor of the first electronic apparatus is configured to control the display of the first electronic apparatus to display a UI corresponding to function frequently used by the user during driving on at least one region of the display on which the basic UI is displayed based on the profile data of the user, and
the function frequently used by the user during driving includes a function previously set as frequently used by the user during driving from among a plurality of functions provided by an IVI system disposed in the vehicle.

12. The system as claimed in claim 11,
wherein the processor of the first electronic apparatus is configured to:
control the function of the vehicle corresponding to the basic UI in response to receiving a first manipulation on the input device of the first electronic apparatus based on the basic UI and the UI corresponding to the function frequently used by the user during driving being displayed together on the display, and
control the communicator of the first electronic device to transmit a command for executing the function frequently used by the user during driving to the IVI system in response to receiving a second manipulation on the input device of the first electronic device.

13. The system as claimed in claim 1,
wherein the processor of the first electronic apparatus is configured to control the display of the first electronic apparatus to display the basic UI based on the received profile data of the user in response to the profile data of the user being received through the communicator from an external mobile device.

14. The system as claimed in claim 1,
wherein the processor of the first electronic apparatus is configured to, in response to information about a content being reproduced in an external mobile device being received, control the communicator to transmit the received information about the content to an IVI system disposed in the vehicle, and
the IVI system is configured to play the content being reproduced in the external mobile device based on the information received from the first electronic apparatus.

15. A method of controlling a system comprising two or more electronic apparatuses disposed in a vehicle, wherein each electronic apparatus includes an input device including a body configured to be rotatable and pushable and a display disposed on the body,
the method comprising:
acquiring profile data of a user including preset information for a function of the vehicle;
displaying a basic UI corresponding to the function of the vehicle based on the acquired profile data of the user;
controlling the function of the vehicle corresponding to the basic UI in response to receiving an input to the input device; and
changing the basic UI of a first electronic apparatus of the two or more electronic apparatuses to a UI related to a user manipulation of the input device of a second electronic apparatus of the two or more electronic apparatuses,
wherein the method further comprises:
in response to starting of the vehicle, displaying a UI corresponding to a function frequently used by the user at a time of starting the vehicle based on the profile data of the user on the display of the first electronic apparatus, the function frequently used by the user at the time of starting the vehicle including at least one function previously set as frequently used by the user at the time of starting the vehicle from among a plurality of functions provided by the IVI system disposed in the vehicle,
in response to the input device of the first electronic apparatus being pushed while the UI corresponding to the function frequently used by the user at the time of starting the vehicle is displayed on the display of the first electronic apparatus, transmitting a command for executing the function frequently used by the user at the time of starting the vehicle to the IVI system, and
in response to the function frequently used by the user at the time of starting the vehicle being terminated, displaying the basic UI based on the profile data of the user on the display of the first electronic apparatus.

16. An input system for a vehicle including a plurality of electronic apparatuses, the input system comprising:

a first electronic apparatus configured to display a first basic UI corresponding to a first function of the vehicle based on profile data of a user including information preset for functions of the vehicle; and a second electronic apparatus configured to display a second basic UI corresponding to a second function of the vehicle based on the profile data of the user, and wherein each of the first and second electronic apparatuses includes an input device including a body configured to be rotatable and pushable and a display disposed on the body, each of the first and second electronic apparatuses are configured to control functions of the vehicle corresponding to the first or second basic UI based on receiving an input on each input device, and the first basic UI is changed to a UI related to a user manipulation of the input device of the second electronic apparatus, wherein the first electronic apparatus is further configured to:

in response to starting of the vehicle, display a UI corresponding to a function frequently used by the user at a time of starting the vehicle based on the profile data of the user on the display of the first electronic apparatus, the function frequently used by the user at the time of starting the vehicle including at least one function previously set as frequently used by the user at the time of starting the vehicle from among a plurality of functions provided by the IVI system disposed in the vehicle, in response to the input device of the first electronic apparatus being pushed while the UI corresponding to the function frequently used by the user at the time of starting the vehicle is dialysed on the display of the first electronic apparatus, transmit a command for executing the function frequently used by the user at the time of starting the vehicle to the IVI system, and in response to the function frequently used by the user at the time of starting the vehicle being terminated, display the basic UI based on the profile data of the user on the display of the first electronic apparatus.

* * * * *